United States Patent
Natsume et al.

(10) Patent No.: US 8,429,241 B2
(45) Date of Patent: Apr. 23, 2013

(54) IMAGE DATA TRANSMITTING APPARATUS AND IMAGE DATA TRANSMITTING METHOD

(75) Inventors: Munehiro Natsume, Toyokawa (JP); Yuji Kobayashi, Toyohashi (JP); Noriyo Kawashima, Fujinomiya (JP); Kiyohito Tsujihara, Toyokawa (JP); Shigeo Tomita, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 876 days.

(21) Appl. No.: 11/260,620

(22) Filed: Oct. 28, 2005

(65) Prior Publication Data

US 2006/0253505 A1    Nov. 9, 2006

(30) Foreign Application Priority Data

May 9, 2005    (JP) .................. 2005-135850

(51) Int. Cl.
*G06F 15/16*   (2006.01)
*G06F 15/00*   (2006.01)

(52) U.S. Cl.
USPC ........................................... 709/217; 358/1.9

(58) Field of Classification Search .................. 709/200, 709/203, 206, 217; 358/1.15, 1.4, 1.9; 400/76; 463/42
See application file for complete search history.

(56) References Cited

U.S. PATENT DOCUMENTS

| | | | | |
|---|---|---|---|---|
| 5,159,692 A | * | 10/1992 | Imai et al. ................. | 711/161 |
| 6,101,526 A | * | 8/2000 | Mochizuki .................. | 709/200 |
| 6,266,683 B1 | * | 7/2001 | Yehuda et al. ............... | 715/234 |
| 6,351,317 B1 | * | 2/2002 | Sasaki et al. ................ | 358/1.15 |
| 6,353,483 B1 | * | 3/2002 | Laverty et al. .............. | 358/1.15 |
| 6,362,895 B1 | * | 3/2002 | Laverty et al. .............. | 358/1.15 |
| 6,381,032 B1 | * | 4/2002 | Laverty et al. .............. | 358/1.15 |
| 6,396,593 B1 | * | 5/2002 | Laverty et al. .............. | 358/1.15 |
| 6,429,947 B1 | * | 8/2002 | Laverty et al. .............. | 358/1.15 |

(Continued)

FOREIGN PATENT DOCUMENTS

| | | |
|---|---|---|
| JP | 9-218938 A | 8/1997 |
| JP | 2000-322338 | 11/2000 |

(Continued)

OTHER PUBLICATIONS

Chun Wong Cheng, A.M.K., An approach for imprecise transmission of TIFF image files through congested real-time ATM networks, Nov. 2-5, 1997, IEEE Local Computer Networks, 1997. Proceedings., 22nd Annual Conference, Abstract.*

(Continued)

*Primary Examiner* — Firmin Backer
*Assistant Examiner* — Michael A Chambers
(74) *Attorney, Agent, or Firm* — Morrison & Foerster LLP

(57) ABSTRACT

Provided is an image data transmitting apparatus capable of transmitting an image data in a given form according to a command from the receiving side. The image data transmitting apparatus is an image data transmitting apparatus transmitting image data to a receiving apparatus through a network, and includes: image data converting unit not only converting the image data to a converted image data file but also preparing file information of the converted image data file; posting unit posting the file information to the receiving apparatus; receiving unit receiving command information concerning a transmitting method for the converted image data file; and transmission controlling unit transmitting the converted image data file to the receiving apparatus based on the command information.

9 Claims, 35 Drawing Sheets

U.S. PATENT DOCUMENTS

| | | | |
|---|---|---|---|
| 6,556,308 B1 * | 4/2003 | Laverty et al. | 358/1.15 |
| 6,559,966 B1 * | 5/2003 | Laverty et al. | 358/1.15 |
| 6,633,890 B1 * | 10/2003 | Laverty et al. | 1/1 |
| 6,757,749 B2 * | 6/2004 | Aoki et al. | 710/5 |
| 6,782,402 B1 * | 8/2004 | Hidaka et al. | 1/1 |
| 6,791,707 B2 * | 9/2004 | Laverty et al. | 358/1.15 |
| 6,903,839 B1 * | 6/2005 | Laverty et al. | 358/1.15 |
| 6,910,065 B2 * | 6/2005 | Matsuki | 709/203 |
| 6,985,245 B1 * | 1/2006 | Takahashi | 358/1.15 |
| 7,017,144 B2 * | 3/2006 | Cohen et al. | 717/100 |
| 7,148,980 B2 * | 12/2006 | Tominaga | 358/1.15 |
| 7,210,103 B2 * | 4/2007 | Kasahara et al. | 715/273 |
| 7,243,126 B2 * | 7/2007 | Sasaki et al. | 709/206 |
| 7,304,756 B2 * | 12/2007 | Hisatake et al. | 358/1.15 |
| 7,321,445 B2 * | 1/2008 | Sato | 358/1.4 |
| 7,400,334 B1 * | 7/2008 | Franklin et al. | 345/619 |
| 7,552,388 B2 * | 6/2009 | Yoshimine | 715/723 |
| 7,617,299 B2 * | 11/2009 | Yoshimine | 709/219 |
| 7,653,707 B2 * | 1/2010 | Yoshimine | 709/219 |
| 2001/0027130 A1 * | 10/2001 | Namba et al. | 463/42 |
| 2001/0032255 A1 * | 10/2001 | Matsuki | 709/219 |
| 2002/0131081 A1 * | 9/2002 | Laverty et al. | 358/1.15 |
| 2002/0133543 A1 * | 9/2002 | Fujiwara | 709/203 |
| 2002/0154334 A1 * | 10/2002 | Laverty et al. | 358/1.15 |
| 2002/0156829 A1 * | 10/2002 | Yoshimine | 709/201 |
| 2002/0186409 A1 * | 12/2002 | Laverty et al. | 358/1.15 |
| 2002/0191213 A1 * | 12/2002 | Laverty et al. | 358/1.15 |
| 2004/0205636 A1 * | 10/2004 | Kasahara et al. | 715/526 |
| 2005/0105135 A1 * | 5/2005 | Takahashi | 358/1.18 |
| 2005/0280854 A1 * | 12/2005 | Sato | 358/1.9 |
| 2006/0033956 A1 * | 2/2006 | Takahashi | 358/1.15 |
| 2006/0130017 A1 * | 6/2006 | Cohen et al. | 717/136 |
| 2006/0221358 A1 * | 10/2006 | Takahashi | 358/1.1 |
| 2007/0065208 A1 * | 3/2007 | Uchida et al. | 400/76 |
| 2007/0118610 A1 * | 5/2007 | Yoshimine | 709/217 |
| 2010/0194753 A1 * | 8/2010 | Robotham et al. | 345/428 |

FOREIGN PATENT DOCUMENTS

| | | |
|---|---|---|
| JP | 2000-322339 | 11/2000 |
| JP | 2000-324282 | 11/2000 |
| JP | 2001-318853 | 11/2001 |
| JP | 2002-140276 | 5/2002 |
| JP | 2002-232836 A | 8/2002 |
| JP | 3346336 | 9/2002 |
| JP | 2002-342218 | 11/2002 |
| JP | 2003-179713 | 6/2003 |
| JP | 2003-179719 | 6/2003 |
| JP | 2004-140654 | 5/2004 |
| JP | 2004-254296 A | 9/2004 |
| JP | 2004-274328 | 9/2004 |

OTHER PUBLICATIONS

Japanese Office Action dated Jul. 3, 2007, directed to counterpart JP Application No. 2005-135850 (2 pages).

Japanese Office Action mailed on Oct. 27, 2009 directed at counterpart application No. 2007-226193; 4 pages.

Japanese Office Action mailed on Oct. 27, 2009 directed at application No. 2007-226193; 5 pages.

\* cited by examiner

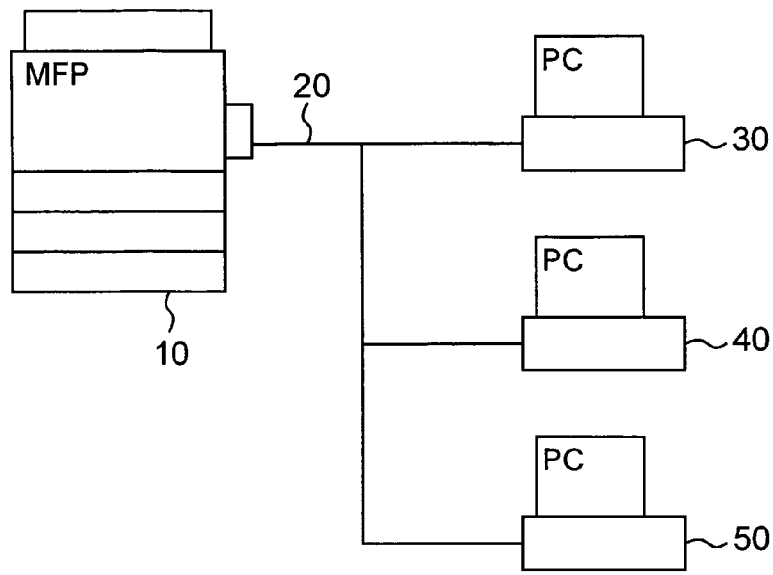
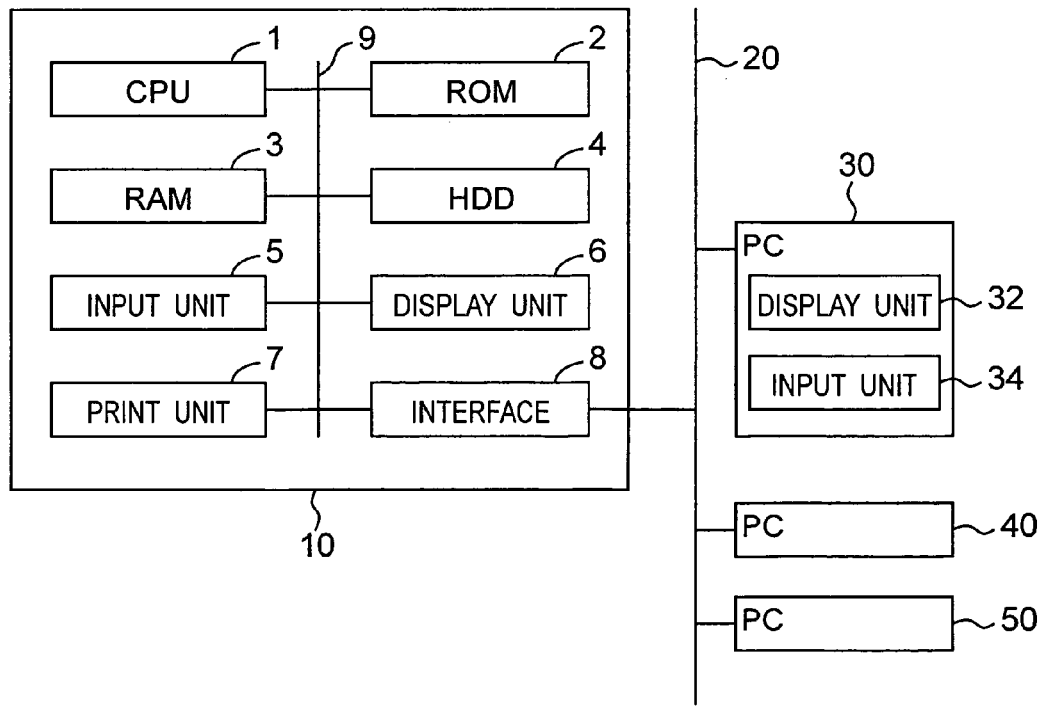

IMAGE DATA TRANSMITTING APPARATUS AND IMAGE DATA TRANSMITTING METHOD

This application is based on Japanese Patent Application No. 2005-135850 filed in Japan on May 9, 2005, the contents of which are hereby incorporated by reference.

BACKGROUND OF THE INVENTION

1. Field of the Invention

This invention relates to an image data transmitting apparatus and an image data transmitting method for transmitting image data to a receiving apparatus through a network.

2. Description of the Related Art

In recent years, a multifunctional peripheral (MFP) has been used, not stand alone but being connected to a network, by plural users. An MFP can transmits image data obtained by scanning a manuscript to a given transmission destination through a network. There is a case where a file capacity of image data is large, and a receiving side consumes resources such as HDD when a file with a larger capacity than necessary is transmitted to the side, while when a file with a large capacity is transmitted to many transmission destinations through a network, a load on the network increases.

Therefore, conventionally, a method has been considered in which a file capacity that can be transmitted is set in advance and only files each with a file capacity equal to or less than the set file capacity are transmitted. For example, there has been known a data communication apparatus in which read image data is stored in a storage region, the data is compared with the upper limit of a file capacity set for each transmission destination and a result of the comparison is posted; then, followed by execution of a processing in which the data is transmitted as is if being smaller in capacity than the upper limit, whereas if the data is larger than the upper limit, transmission of the data is interrupted, only a given statement is transmitted or a given statement and attached file information are transmitted, as shown in Japanese Patent Laid-open Publication No. 2003-179713.

There has been known another image communication apparatus in which a file capacity of read image data is compared with an allowed capacity; it is posted that the file capacity exceeds the allowed capacity if such a case arises and the read image data is transmitted by limiting the number of pages so as to be lower than the allowed capacity or converting a resolution without limitation, as shown in Japanese Patent Laid-open Publication No. 2002-140276.

There has been known, in addition, a network copy file management system in which read image data file is stored into a disk, management information of a file (such as an image list) is transmitted in response to a request from a PC and designated image data is read from the disk and transmitted when required, as shown in Japanese Patent Laid-open Publication No. 2000-322338.

Since a processing such as transmission interruption, in the example, is executed on the transmitting side according to conditions such as a file capacity set in advance, however, a case arises where required image data cannot be timely received by the receiving side.

SUMMARY OF THE INVENTION

It is an object of the invention to provide an image data transmitting apparatus capable of transmitting image data in a given form according to a command of the receiving side.

An image data transmitting apparatus pertaining to the invention is an image data transmitting apparatus transmitting image data to a receiving apparatus through a network, including:

image data converting unit for not only converting the image data to a converted image data file but also preparing file information of the converted image data file;

posting unit for posting the file information to the receiving apparatus;

receiving unit for receiving command information concerning a transmitting method for the converted image data file; and transmission controlling unit for transmitting the converted image data file to the receiving apparatus based on the command information.

The posting unit may transmit part of the converted image data file together with the file information to the receiving apparatus. The posting unit may transmit a preview version of the converted image data file together with the file information to the receiving apparatus.

Note that the converting unit can convert the image data to plural converted image data file with respective different resolutions. In this case, the posting unit respectively transmits preview versions of the plural converted image data files with respective different resolutions together with file information thereof to the receiving apparatus.

The image data transmitting apparatus further includes image data compiling unit for compiling the converted image data based on the command information.

The compiling unit can prepare converted image data file obtained by altering a resolution of the converted image data file based on the command information. In this case, the transmission controlling unit can transmit an image compilation data file to the receiving apparatus.

The transmission controlling unit can transmit a converted image data file containing only a necessary page or pages to the receiving apparatus based on the command information. The transmission controlling unit can divide the converted image data file based on the command information to transmit the data file with a smaller capacity after the division to the receiving apparatus. The transmission controlling unit can store the converted image data file into a given storage destination based on the command information, and transmits stored information concerning the storage destination to the receiving apparatus.

The image data transmitting apparatus may still further include data storage unit for storing the received command information. In this case, the transmission controlling unit can transmit the converted image data according to the command information to the receiving apparatus in a case where the command information about the receiving apparatus exists in the data storing unit.

In a case where, after a given time elapses from the time when the file information is transmitted to the receiving apparatus by the posting unit, if the command information has not yet been received from the receiving apparatus, the transmission controlling unit can store the converted image data file in a given storage destination, and posts storage information concerning the storage destination to the receiving apparatus.

In a case where, after a given time elapses from the time when the file information is transmitted to the receiving apparatus by the posting unit, if the command information has not yet been received from the receiving apparatus, the transmission controlling unit can prepare an image compilation data file compiled with the minimum resolution from the converted image data file to transmit the image compilation data file to the receiving apparatus.

In a case where, after a given time elapses from the time when the file information is transmitted to the receiving apparatus by the posting unit, if the command information has not yet been received from the receiving apparatus, the transmission controlling unit can post the file information to a second transmission destination related to the receiving apparatus.

In a case where, after a given time elapses from the time when the file information is transmitted to the receiving apparatus by the posting unit, if the command information has not yet been received from the receiving apparatus, the transmission controlling unit can post it to a given command destination that no command information has been received, and transmits the converted image data file to the receiving apparatus based on command information from the command destination.

An image data transmitting method pertaining to the invention is an image data transmitting method transmitting image data to a receiving apparatus through a network, including:

not only converting the image data to a converted image data file, but also preparing file information of the converted image data file;

posting the file information to the receiving apparatus;

receiving command information concerning to a transmitting method for the converted image data file; and transmitting the converted image data file to the receiving apparatus based on the command information.

Note that the image data transmitting method may be an image data transmission program characterized by causing a computer to execute the image data transmitting method. The image data transmission program may be stored into a computer-readable recording medium.

The image data transmitting apparatus may further include reading unit for reading a manuscript to generate image data. In this case, the image data transmitting apparatus can work as a scanning apparatus.

An image data transmitting apparatus pertaining to the invention, when transmitting image data to the receiving apparatus, posts file information of a converted image data file, which is to be transmitted, to the receiving apparatus to control transmission of the converted image data file according to command information from the receiving apparatus. Thereby, the image data transmitting apparatus can transmit the converted image data file to the receiving apparatus based on a command of the receiving apparatus.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 1 is a schematic diagram showing a relationship of an image data transmitting apparatus (MFP) connected to a network with a receiving apparatus (a transmission destination) and a transmission source;

FIG. 2 is a block diagram showing a physical construction of an image data transmitting apparatus;

DESCRIPTION OF THE PREFERRED EMBODIMENTS

Figure 3:
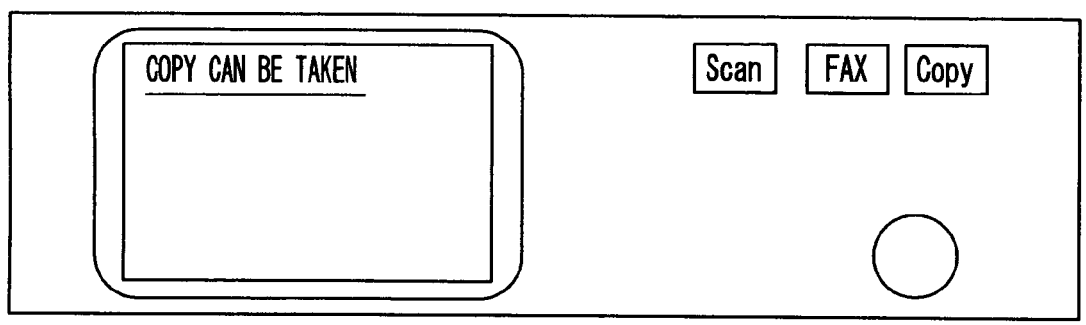
FIG. 3 is a schematic diagram showing an example base screen image on a display unit of an image data transmitting apparatus (MFP)

Description will be given of image data transmitting apparatuses pertaining to embodiments of the invention using the accompanying drawings. Note that in the figures, the same symbols are attached to substantially the same members.

First Embodiment

FIG. 1 is a diagram showing a schematic construction of a network system including an image data transmitting apparatus 10 pertaining to the first embodiment of the invention. The image data transmitting apparatus 10 is connected to a receiving apparatus (transmission destination) 30, a transmission source 40 and an external storage destination 50 through a network 20. FIG. 2 is a block diagram showing a physical construction of the image data transmitting apparatus 10. The image data transmitting apparatus 10 includes: CPU1, ROM2, RAM3, HDD4, an input unit 5, a display unit 6, a print unit 7, an interface 8 and a bus 9, both connectable to the network 20. The transmission destination 30 includes a display unit 32 and an input unit 34.

Figure 4:
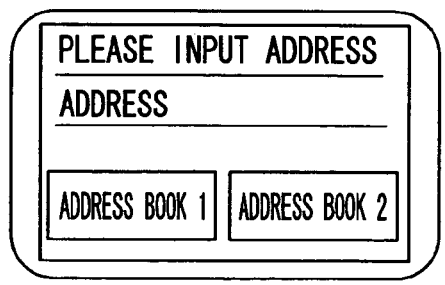
FIG. 4 is a representation showing a scan mode screen image in a case where a scan key is pushed of an image data transmitting apparatus (MFP)

FIG. 3 is a diagram showing an example base screen image on the image data transmitting apparatus 10. In the basic screen image, a function of copying, scanning or facsimile can be executed by selecting a button on the screen image. FIG. 4 is an example in which a transmission destination/a transmission source is set when a function of a scan & send transmitting read image data is executed in a case where scan of FIG. 3 is selected. An address of the transmission destination/the transmission source may be either directly inputted or selected from an address book. Note that the transmission destination 30 here is an address to which image data is transmitted and the transmission source 40 is a user terminal commanding scan & send. Since a user is present on the side of the image data transmitting apparatus 10 while a manuscript is scanned, the user can set the user terminal as the transmission source 40 on a screen image of the image data transmitting apparatus 10.

Figure 5:
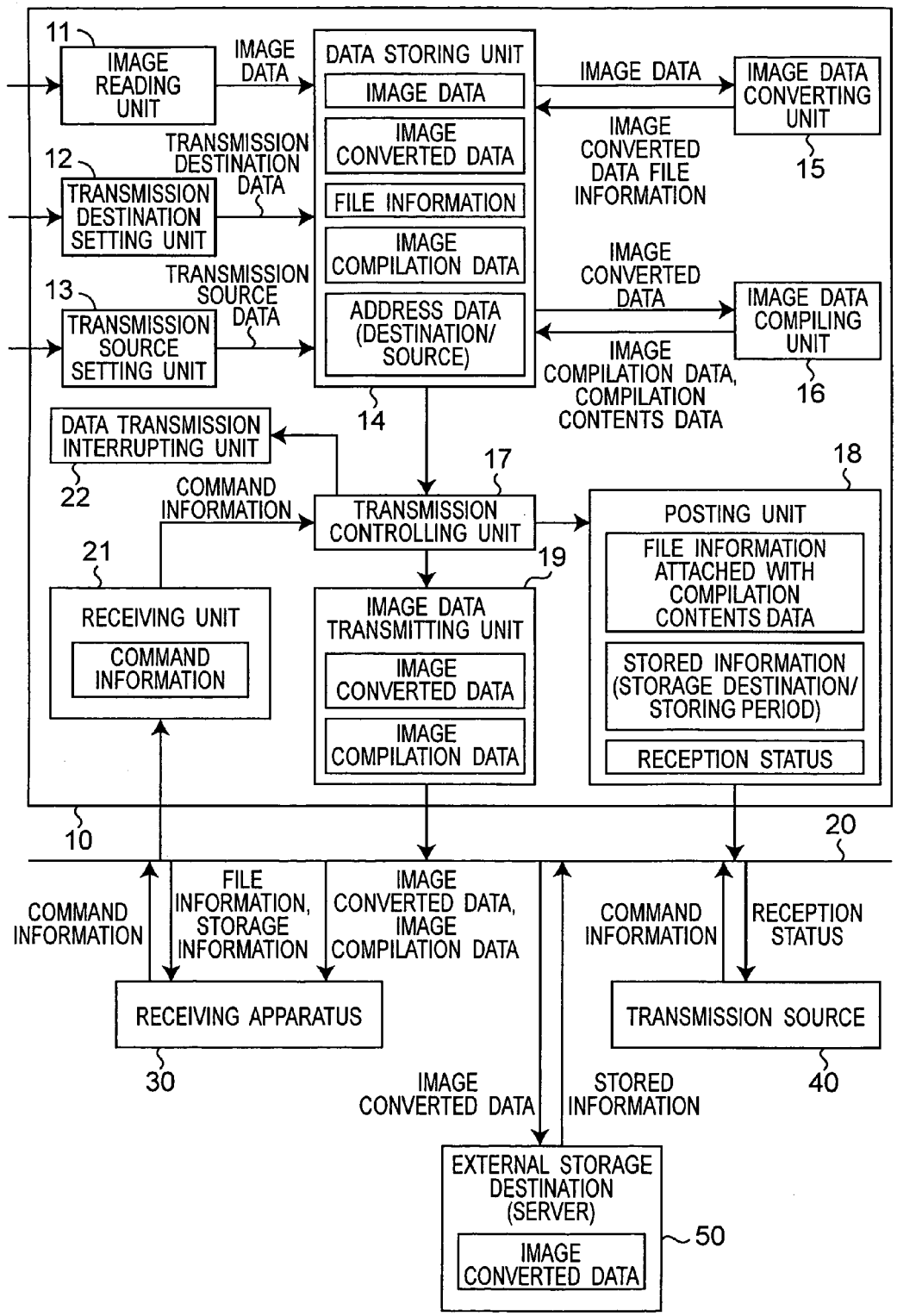
FIG. 5 is a block diagram showing a functional construction of an image data transmitting apparatus pertaining to a first embodiment of the invention.

FIG. 5 is a block diagram showing a functional construction of the image data transmitting apparatus 10. The image data transmission apparatus 10 includes: an image reading unit 11; a transmission destination setting unit 12; a transmission source setting unit 13; a data storing unit 14; an image data converting unit 15; an image data compiling unit 16, a transmission controlling unit 17; a posting unit 18; an image data transmitting unit 19; a receiving unit 21; and a data transmitting interrupting unit 22.

Then, description will be given of construction members. The image reading unit 11 is, for example, a scanning unit and generates image data. Since the image data transmitting apparatus 10 is equipped with the image reading unit 11, the apparatus can also function as a scanning apparatus. Transmission destination data is inputted by the transmission destination setting unit 12 and transmission source data is inputted by the transmission source setting unit 13. The data storing unit 14 records image data, converted image data, file information, image compilation data, and address data (a transmission destination/a transmission source). The image data converting unit 15 not only converts image data to generate converted image data, but also generates file information such as capacity information of the converted image data. The image data compiling unit 16 compiles converted image data to generate image compilation data and compilation contents data thereof. The transmission controlling unit 17 controls the posting unit 18, the image data transmitting unit 19 and the data transmission interrupting unit 22. The posting unit 18 transmits file information and storage information to the receiving apparatus (the transmission destination) 30 and a reception status to the transmission source 40. The image data transmitting unit 19 transmits either converted image data and image compilation data to the receiving apparatus 30 or converted image data to an external storage destination (a server) 50. The receiving unit 21 receives command information from the receiving apparatus 30 or the transmission source and storage information from the external storage destination 50.

The image data transmission apparatus 10, when transmitting image data to the receiving apparatus 30, posts file information of a converted image data file, which is to be transmitted, to the receiving apparatus 30 and controls transmission of converted image data file according to command information from the receiving apparatus 30. Thereby, the image data transmitting apparatus 10 can transmit converted image data file in the form desired on the receiving apparatus 30 side to the receiving apparatus 30.

Figure 6:
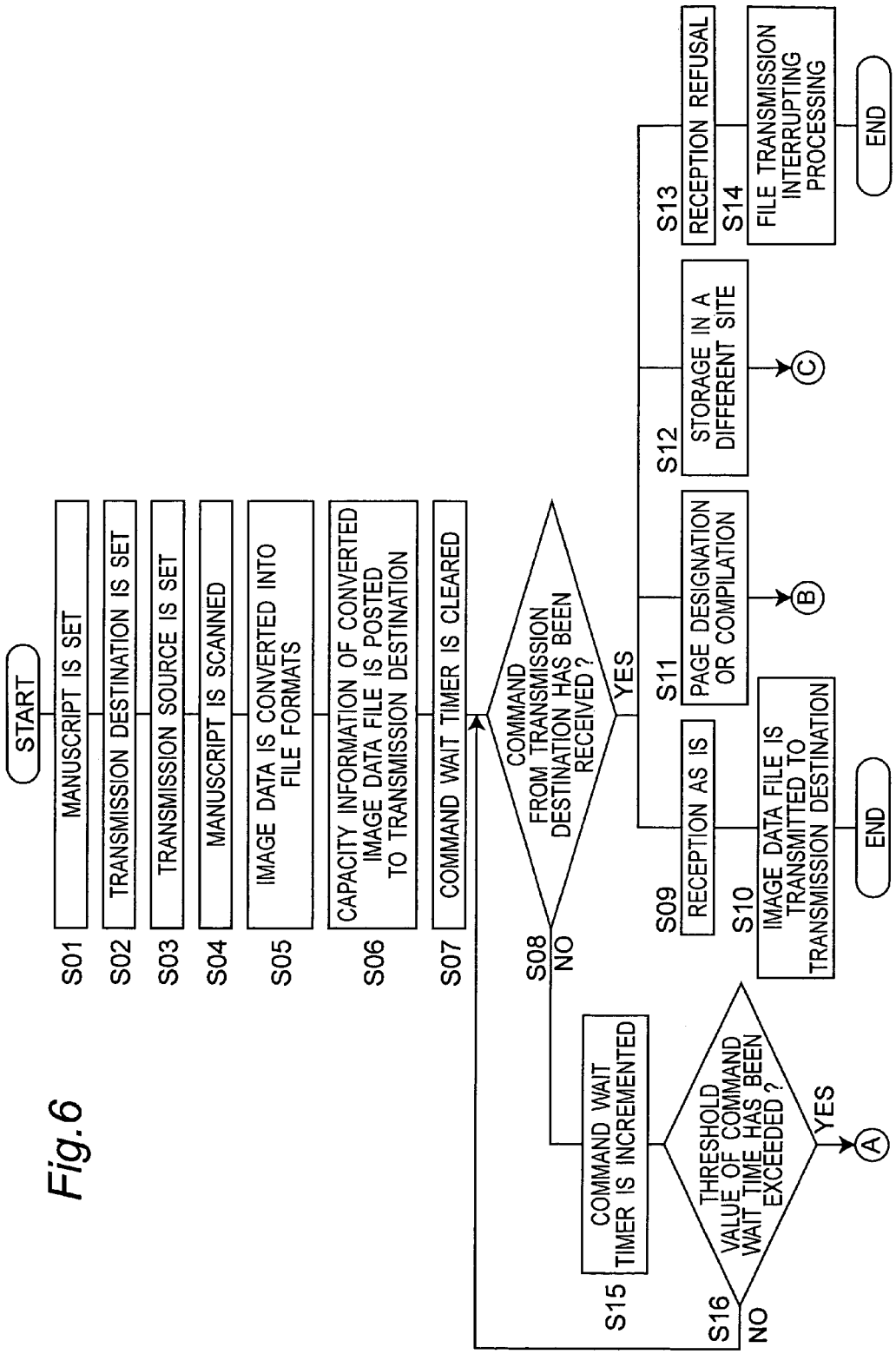
FIG. 6 is a flowchart of the image data transmitting method pertaining to the first embodiment of the invention.
Figure 7:
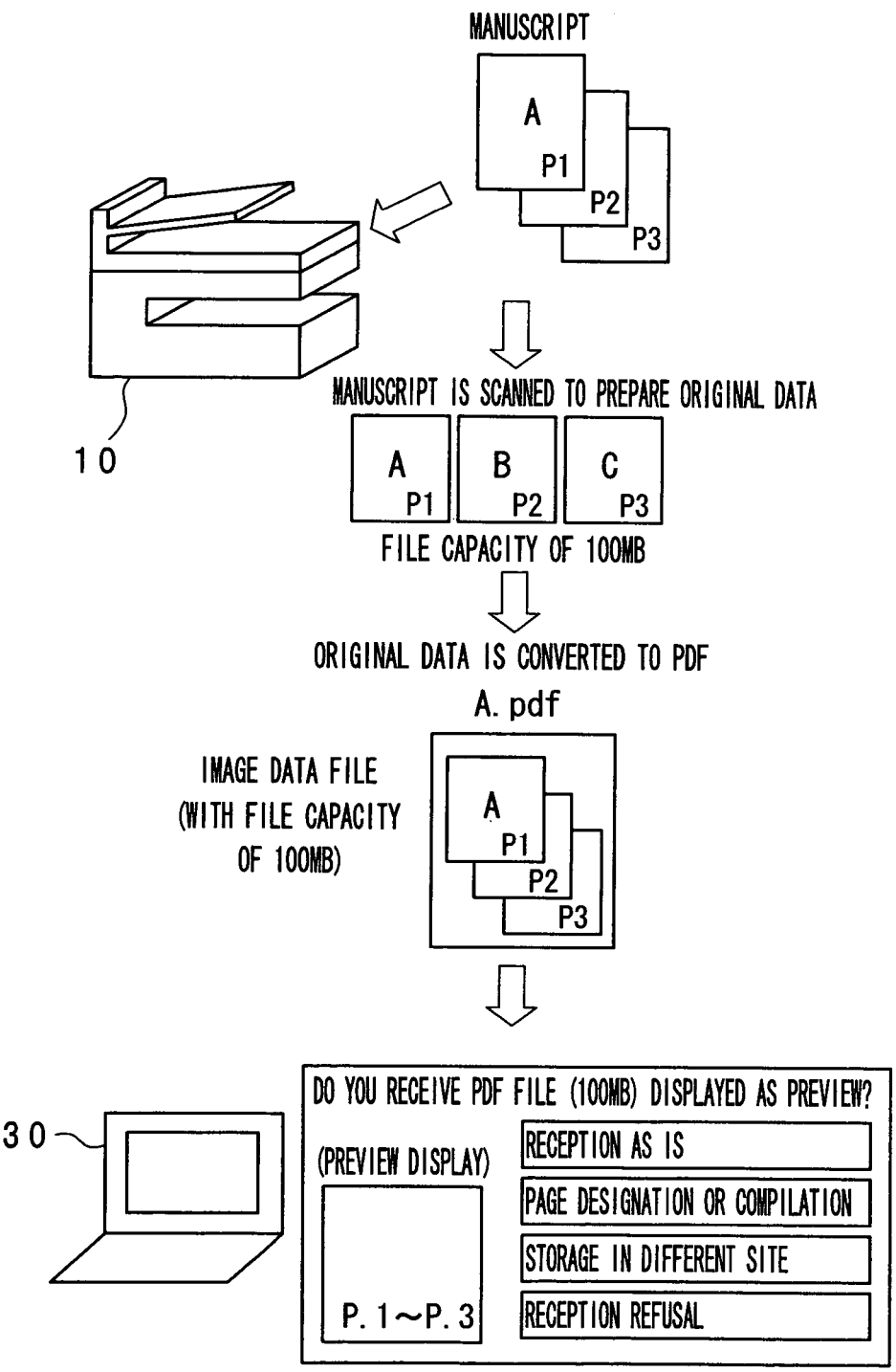
FIG. 7 is a schematic representation showing a concrete example of the image data transmitting method pertaining to the first embodiment of the invention.
Figure 8:
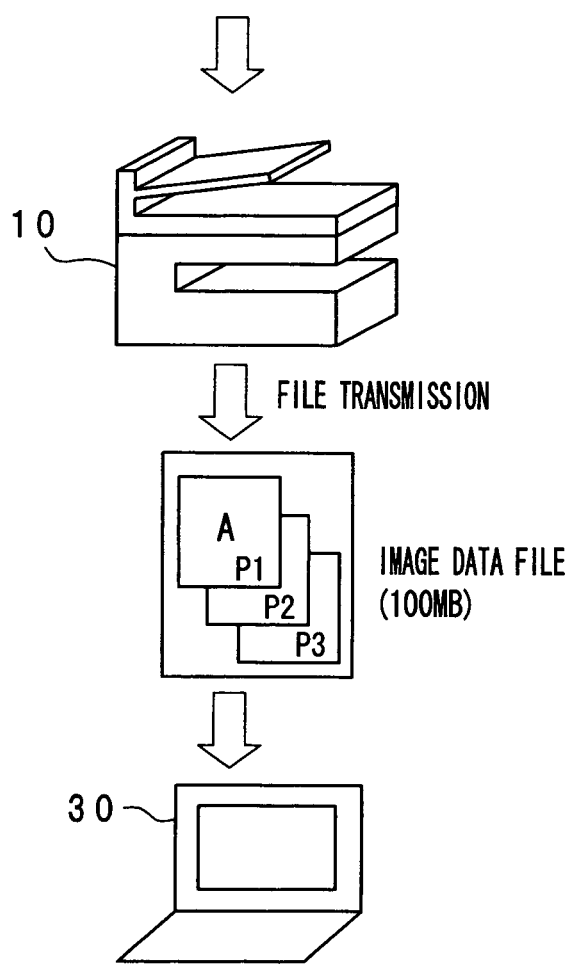
FIG. 8 is a schematic representation showing a concrete example of image data transmission in a case where "reception as is" is selected in a receiving apparatus.

FIG. 6 is a flowchart of the image data transmitting method. FIGS. 7 and 8 are representations schematically describing an image data transmitting method of the flow chart shown in FIG. 6.

(a) A manuscript is set (S01). Here, a case where a mail is transmitted after scanning is shown as an example.

(b) The transmission destination 30 is set (S02). The transmission destination 30 is the receiving apparatus at an address to which image data is transmitted through the network 20.

(c) The transmission source 40 is set (S03). The transmission source 40 is a user terminal that has commanded transmission of image data.

(d) A manuscript is scanned (S04). To be concrete, the image reading unit 11 can read the manuscript to thereby obtain an image data (an original data).

(e) Image data is converted to respective file formats (S05). To be concrete, the image data converting unit 15 converts, as shown in the example in FIG. 7, image data, for example, to a PDF file (A. pdf). The image data converting unit 15 prepares file information such as capacity information (100 MB) of the PDF file after the conversion.

(f) Capacity information of the image data file (PDF file) after the conversion is posted to the transmission destination 30 through the network 20 (S06). Contents of a message is displayed on a screen, for example, as shown in FIG. 7. In the example of image display, there are displayed 4 options of the command including "reception as is", "page designation or compilation", "storage in a different site" and "reception refusal." A user transmits command information selected from the 4 options to the image data transmitting apparatus 10.

(g) The image data transmitting apparatus 10 clears command wait timer (S07).

(h) It is determined whether or not a command from the transmission destination 30 has been received (S08). If a command has been received, the process is branched out into one of S09, S11, S12 and S13 according to the command. On the other hand, if a command has not been received, the process moves to step S15.

(i-1) The process is in a case where a command of "reception as is" has been received from the transmission destination 30 (step 09). In FIG. 8, there is shown an example in the case of this command.

(j-1) Image data file is transmitted to the transmission destination 30 from the image data transmitting apparatus 10 through the network 20 (S10). Thereafter, the process is terminated.

(i-2) The process is in a case where a command of "page designation or compilation" has been received from the transmission destination 30 (S11). This case will be described later as a branch B.

(i-3) The process is in a case where a command of "storage in a different site" has been received from the transmission destination 30 (S12). This case will be described later as a branch C.

(i-4) The process is in a case where a command of "reception refusal" has been received from the transmission destination 30 (S13).

(j-4) Since the command is reception refusal, file transmission interruption processing is conducted in the data transmission interrupting unit (S14). Thereafter, the process is terminated.

(k) In a case where no command has been received from the receiving apparatus 30 in step S08, the process moves to this step and the command wait timer is incremented (S15).

(I) It is determined whether or not it has exceeded a threshold value of a command wait time (S16). If the threshold value has been exceeded, the process will be described as branch A. On the other hand, if the threshold value has not been exceeded, the process returns to step S08 of determining command reception from the transmission destination In the course of the steps, image data can be transmitted to the reception destination 30 based on command information of the transmission destination 30.

Second Embodiment

Figure 9:
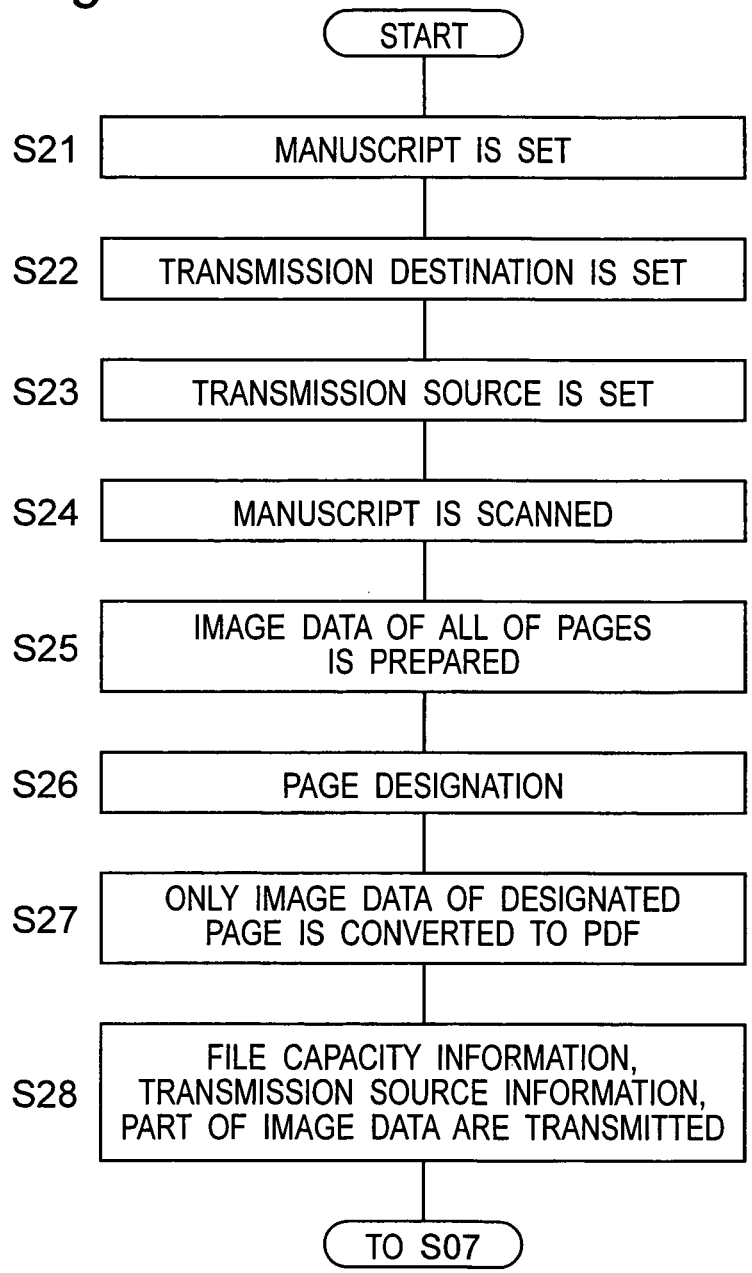
FIG. 9 is a flowchart of an image data transmitting method pertaining to a second embodiment of the invention.
Figure 10:
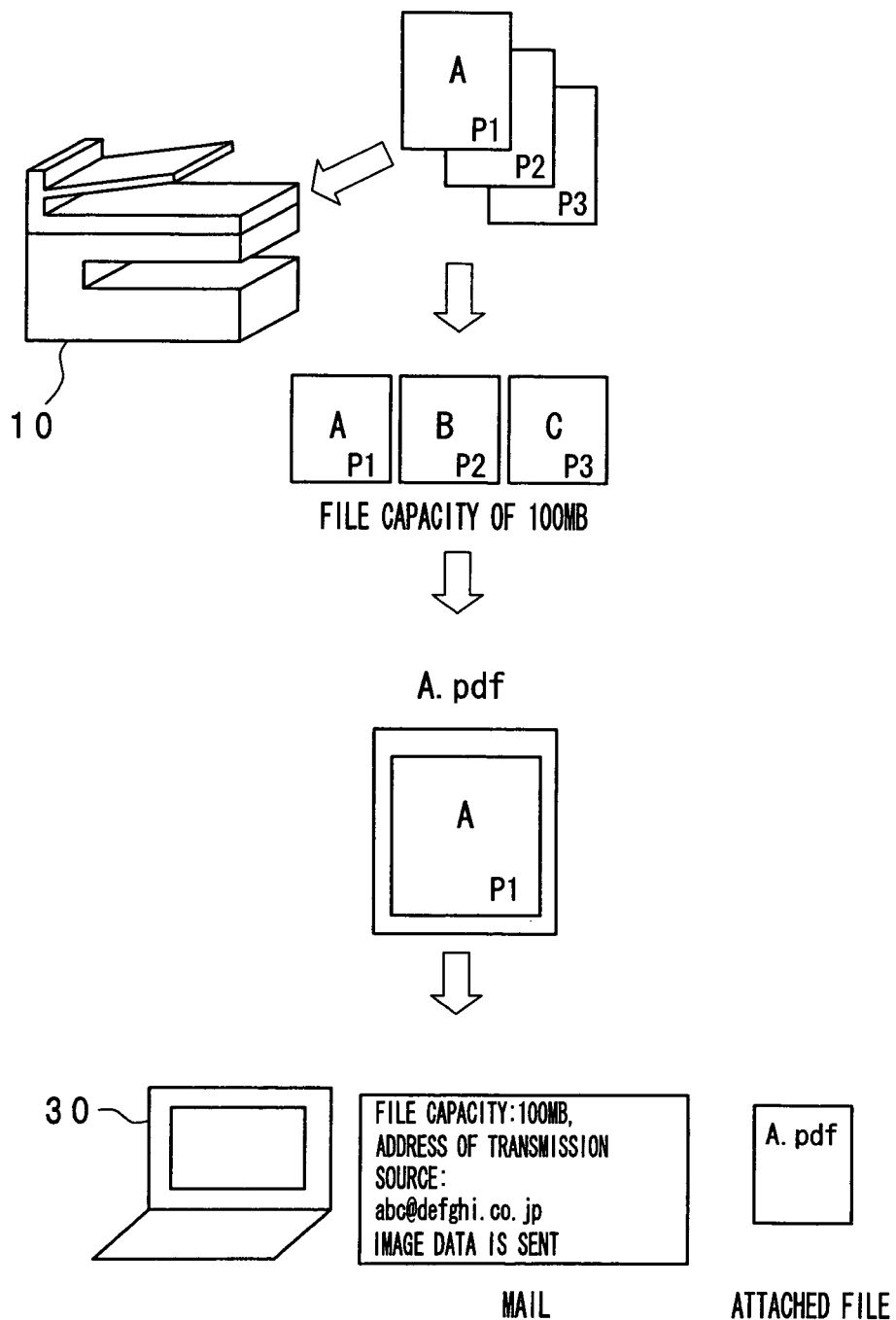
FIG. 10 is a schematic representation showing a concrete example of the image data transmitting method pertaining to the second embodiment of the invention.

FIG. 9 is a flowchart of an image data transmitting method pertaining to the second embodiment of the invention. FIG. 10 is a representation schematically describing the image data transmitting method of the flowchart of FIG. 9.

(a) A manuscript is set (S21).
(b) A transmission destination 30 is set (S22).
(c) A transmission source 40 is set (S23).
(d) The manuscript is scanned (S24).
(e) Image data covering all of pages is prepared from the manuscript (S25).
(f) A page is designated (S26). Note that this designation is a default designation, which can also be altered. In the example of FIG. 10, only the first page is designated.
(g) Only image data on the designated page is converted to a PDF file (A. pdf) (S27).
(h) Posted to the transmission destination 30 as confirmation are capacity information of an image file, transmission source information and part of the image data file in a case where all of the pages is converted to the PDF files (S28). The transmission destination 30 displays a received message on a screen, for example, as shown in FIG. 10.
(i) Thereafter, the process moves to step S07 of FIG. 6. The step and steps subsequent thereto are similar to the corresponding steps in the flow chart of FIG. 6; therefore, description thereof is omitted.

In the course of the steps, image data of a designated page only is posted to the transmission destination 30 for confirmation; therefore, reception load at the transmission destination 30 is alleviated, and a load on a network is also reduced.

Third Embodiment

Figure 11:
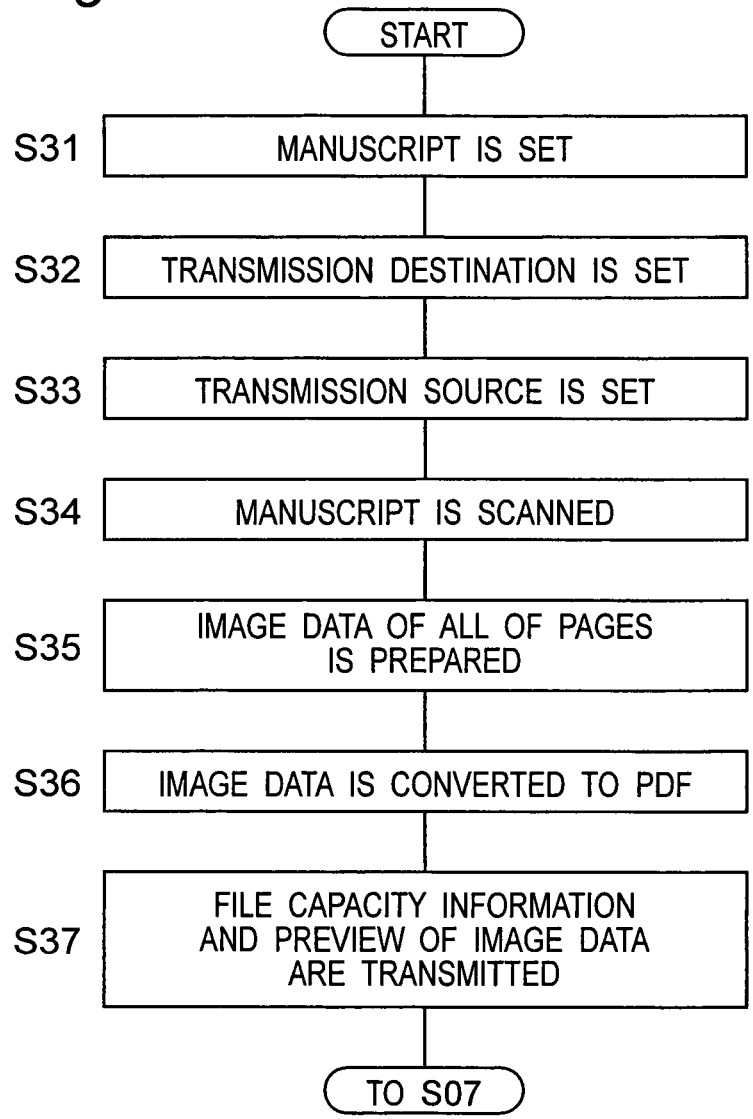
FIG. 11 is a flowchart of an image data transmitting method pertaining to a third embodiment of the invention.
Figure 12:
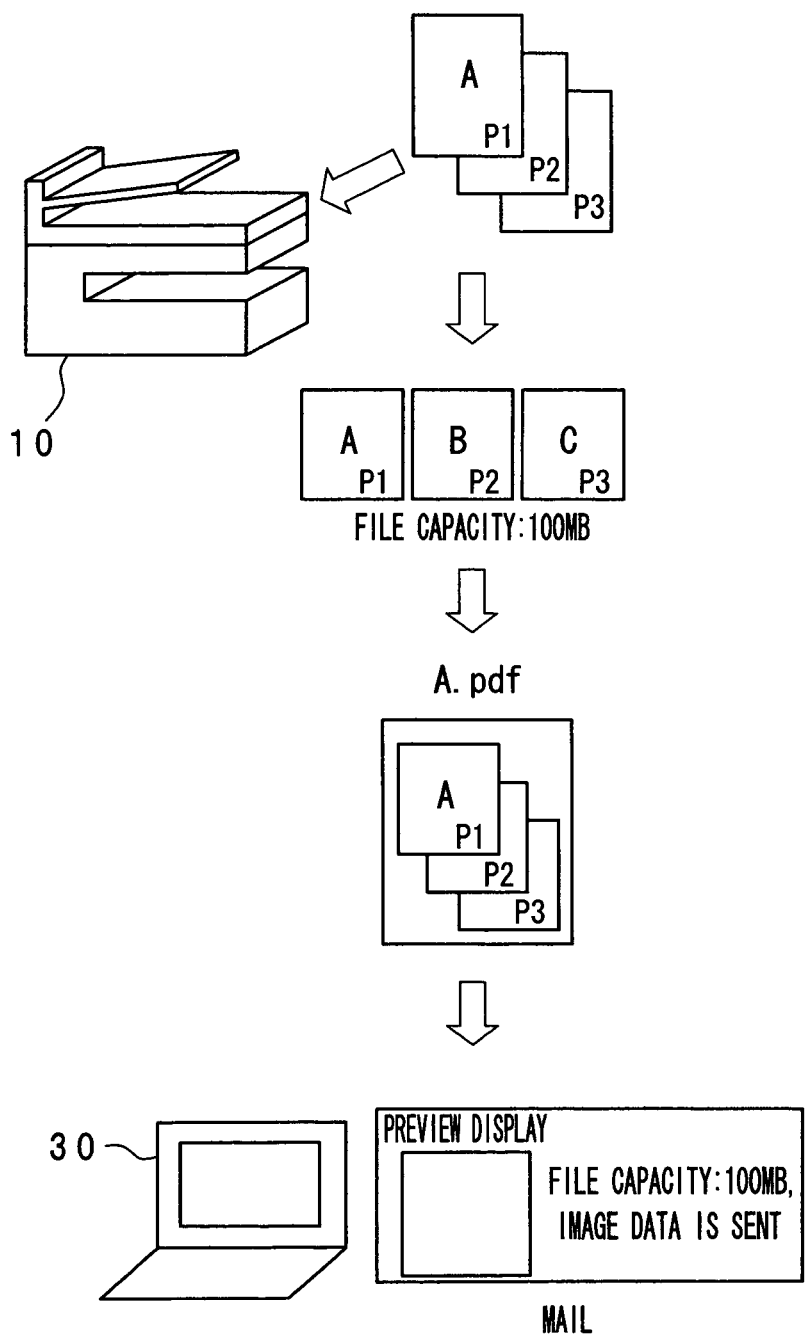
FIG. 12 is a schematic representation showing a concrete example of the image data transmitting method pertaining to the third embodiment of the invention.

FIG. 11 is a flowchart of an image data transmitting method pertaining to the third embodiment of the invention. FIG. 12 is a representation schematically describing the image data transmitting method of the flowchart of FIG. 11.

(a) A manuscript is set (S31).
(b) A transmission destination 30 is set (S32).
(c) A transmission source 40 is set (S33).
(d) The manuscript is scanned (S34).
(e) Image data covering all of pages is prepared from the manuscript (S35).
(f) The image data is converted to a PDF file (S36).
(g) Posted to the transmission destination 30 are capacity information of image data file after the conversion and a preview of image data (S37). In the transmission destination 30, the preview of image data is displayed as shown in FIG. 12. Thereby, it can be examined whether or not image data is required at the transmission destination 30, which makes it possible to quickly command to the image data transmitting apparatus 10.
(h) Thereafter, the process moves to step S07 of FIG. 6. The step and steps subsequent thereto are similar to the corresponding steps in the flowchart of FIG. 6.

In the course of the steps, the preview version is posted, command information can be quickly received from the transmission destination 30.

Fourth Embodiment

Figure 13:
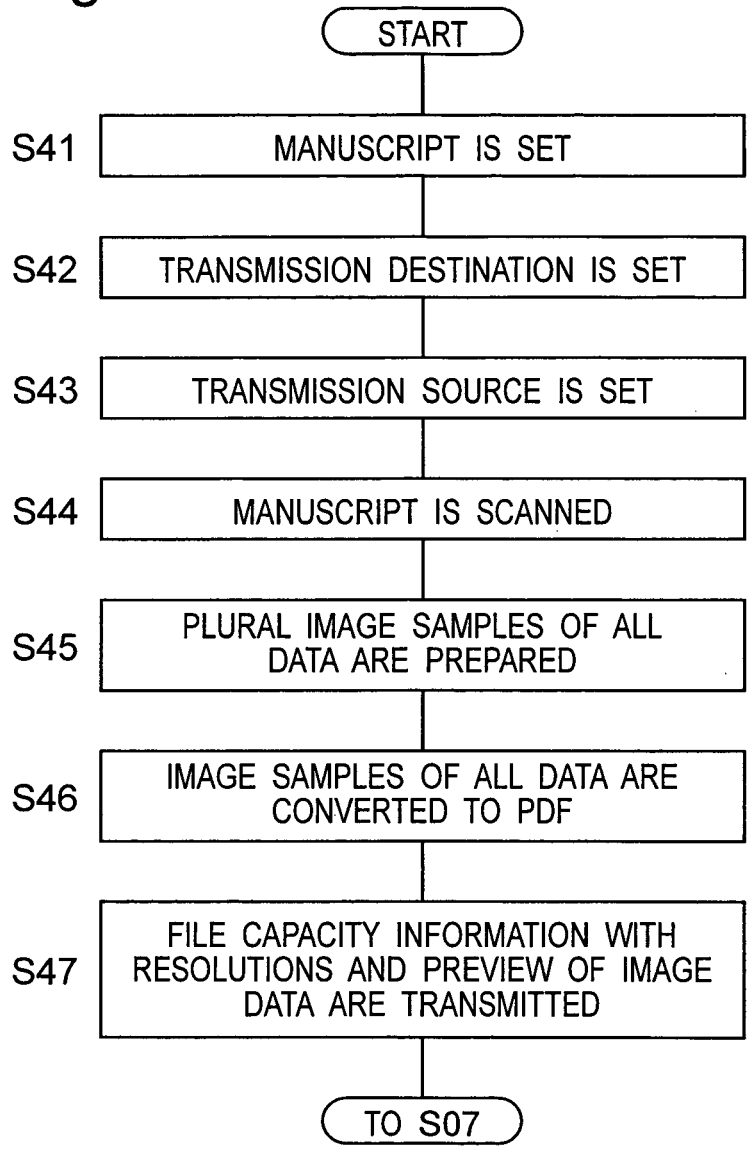
FIG. 13 is a flowchart of an image data transmitting method pertaining to a fourth embodiment of the invention.
Figure 14:
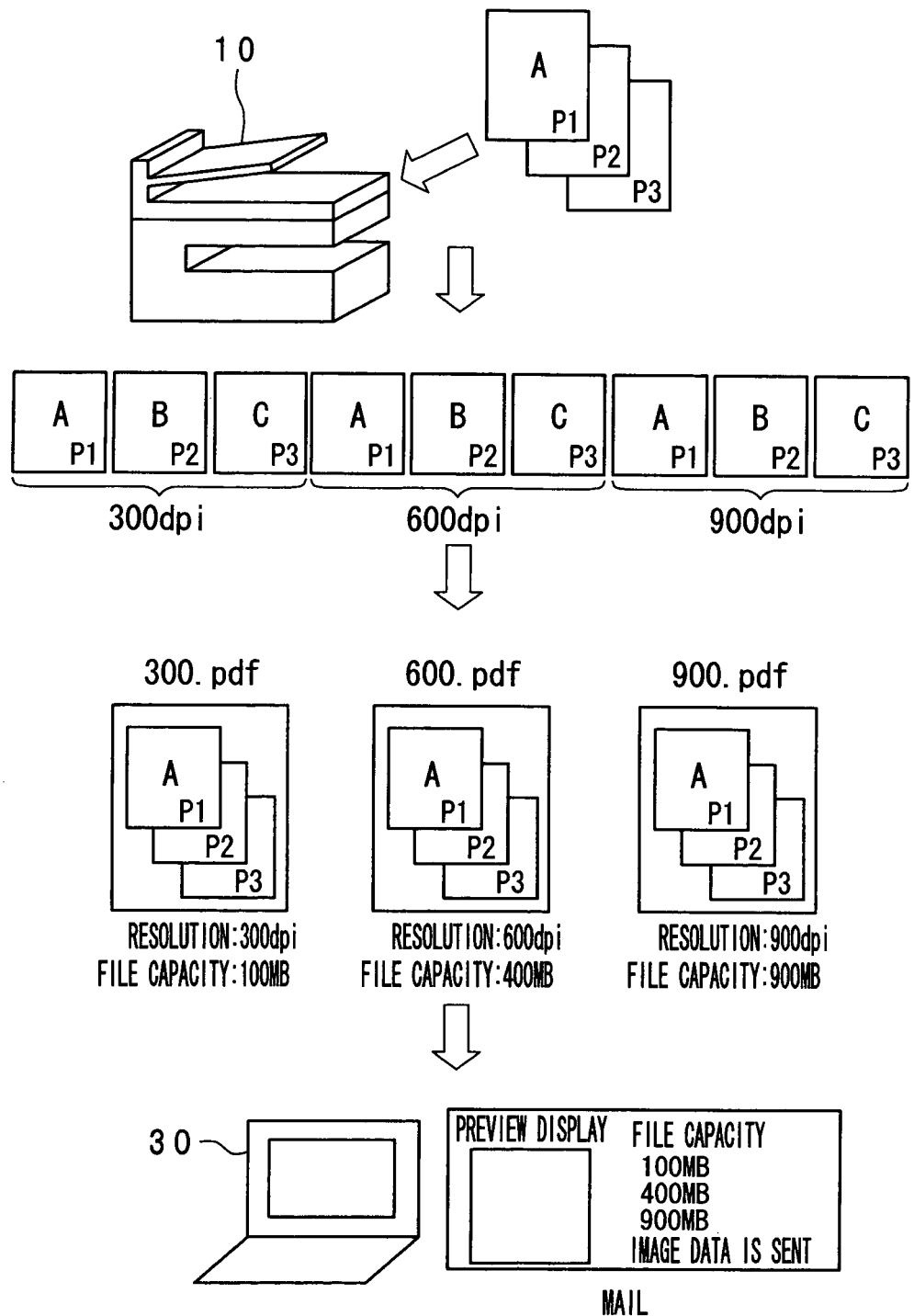
FIG. 14 is a schematic representation showing a concrete example of the image data transmitting method pertaining to the fourth embodiment of the invention.

FIG. 13 is a flowchart of an image data transmitting method pertaining to a fourth embodiment of the invention. FIG. 14 is a representation schematically describing the image data transmitting method of the flowchart shown in FIG. 13.

(a) A manuscript is set (S41).
(b) A transmission destination 30 is set (S42).
(c) A transmission source 40 is set (S43).
(d) The manuscript is scanned (S44).
(e) Plural image samples with respective different resolutions of all of pages of a manuscript are prepared (S45). In the example of FIG. 14, prepared are three kinds of image samples with respective resolutions of 300 dpi, 600 dpi and 900 dpi.
(f) Prepared image samples of all of the pages are converted to PDF files (S46). In the example shown in FIG. 14, the image sample with a resolution of 300 dpi is converted to a PDF file 300.pdf (with a capacity of 100 MB), the image sample with a resolution of 600 dpi is converted to a PDF file 600.pdf (with a capacity of 400 MB) and the image sample with a resolution of 900 dpi is converted to a PDF file 900.pdf (with a capacity of 900 MB).
(g) Posted to the transmission destination 30 are previews of image data including capacity information of the PDF files after conversion with respective resolutions and image data with the resolutions (S47). Displayed in the transmission destination 30 are, as shown in FIG. 14, preview displays, capacities of the PDF files with resolutions including 100 MB, 400 MB and 900 MB. Thereby, a PDF file with a proper resolution is selected at the transmission destination 30, which makes it possible to command the image data transmission apparatus 10.
(h) The process moves to step S07 of FIG. 6. The step and steps subsequent thereto are similar to corresponding steps of the flow chart of FIG. 6.

In the course of the steps, a PDF file with a proper resolution can be transmitted to the transmission destination 30 based on command information from the transmission destination 30.

Fifth Embodiment

Figure 15:
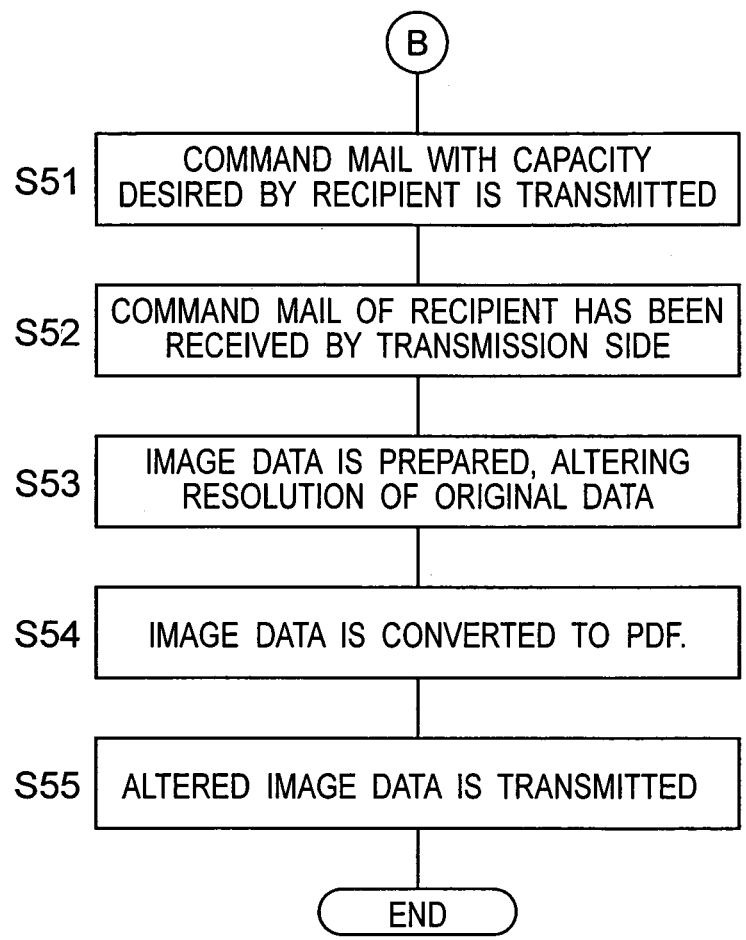
FIG. 15 is a flowchart of an image data transmitting method pertaining to a fifth embodiment of the invention.
Figure 16:
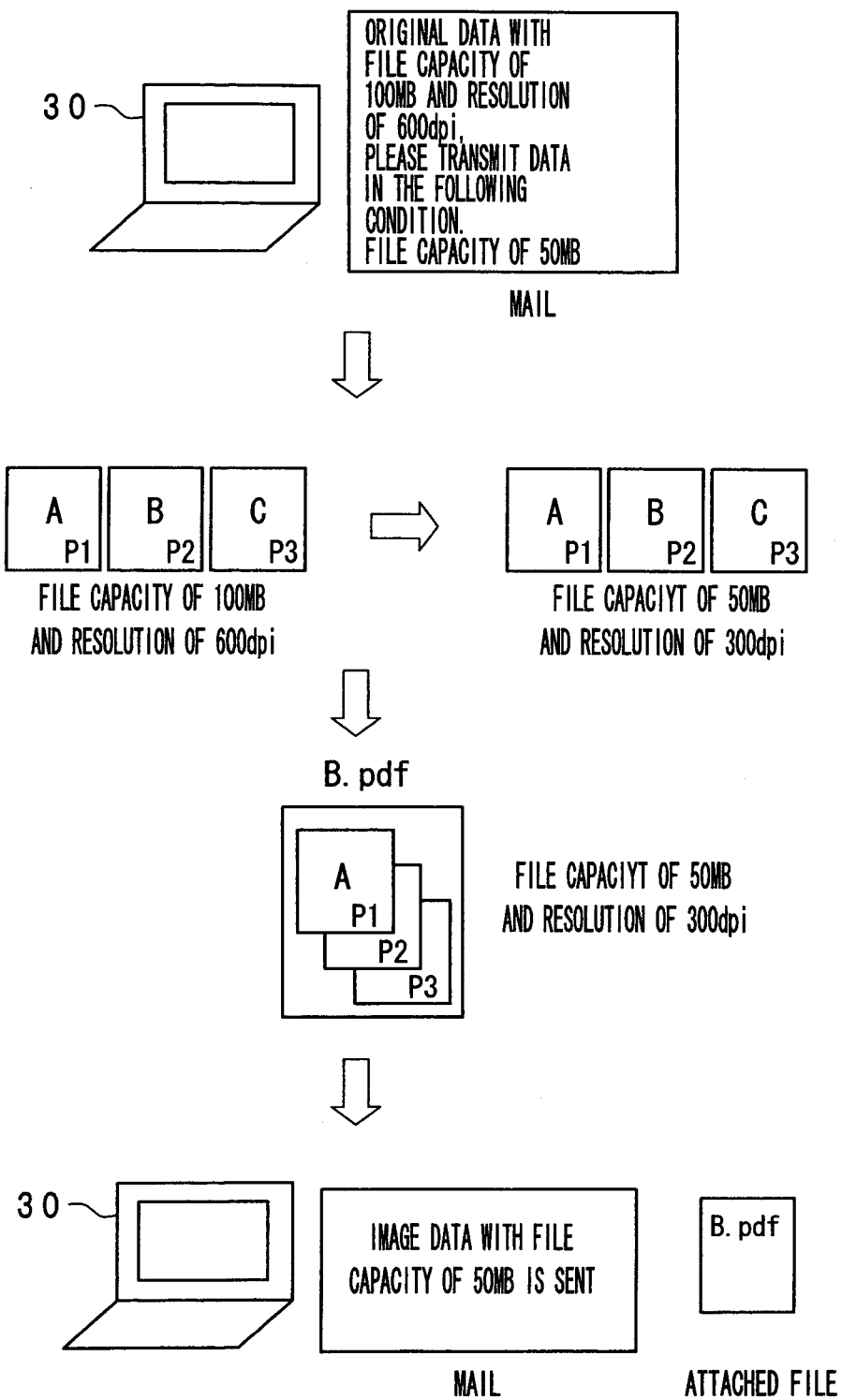
FIG. 16 is a schematic representation showing a concrete example of the image data transmitting method pertaining to the fifth embodiment of the invention.

FIG. 15 is a flowchart of an image data transmitting method pertaining to the fifth embodiment of the invention. FIG. 16 is a representation schematically describing the image data transmitting method of the flowchart of FIG. 15.

(a) Transmitted is a command mail with a capacity desired by the recipient (the transmission destination) 30 (S51). This is an example of the branch B of the flowchart of FIG. 6. In the example of FIG. 16, command information saying "Please transmit data in the following conditions. File capacity of 50 MB" is transmitted to the image data transmitting apparatus 10.

(b) The transmission side (the image data transmitting apparatus) 10 receives a command mail of the recipient (the transmission destination) 30 (S52).

(c) A resolution of original data is altered to prepare image data (S53). In the example of FIG. 16, for example, since a PDF file obtained by converting the original data with a resolution 600 dpi has a file capacity is 100 MB, a resolution is adjusted to be lower as a whole or partly (for example, 300 dpi) so that a file capacity of the PDF file is 50 MB.

(d) image data is converted to a PDF file (B.pdf) (S54).

(e) Converted image data (PDF file: B.pdf) is transmitted to the transmission destination 30 (S55).

In the course of the steps, image data with a file capacity which is reduced based on command information from the transmission destination 30 can be transmitted to the transmission destination 30.

Sixth Embodiment

Figure 17:
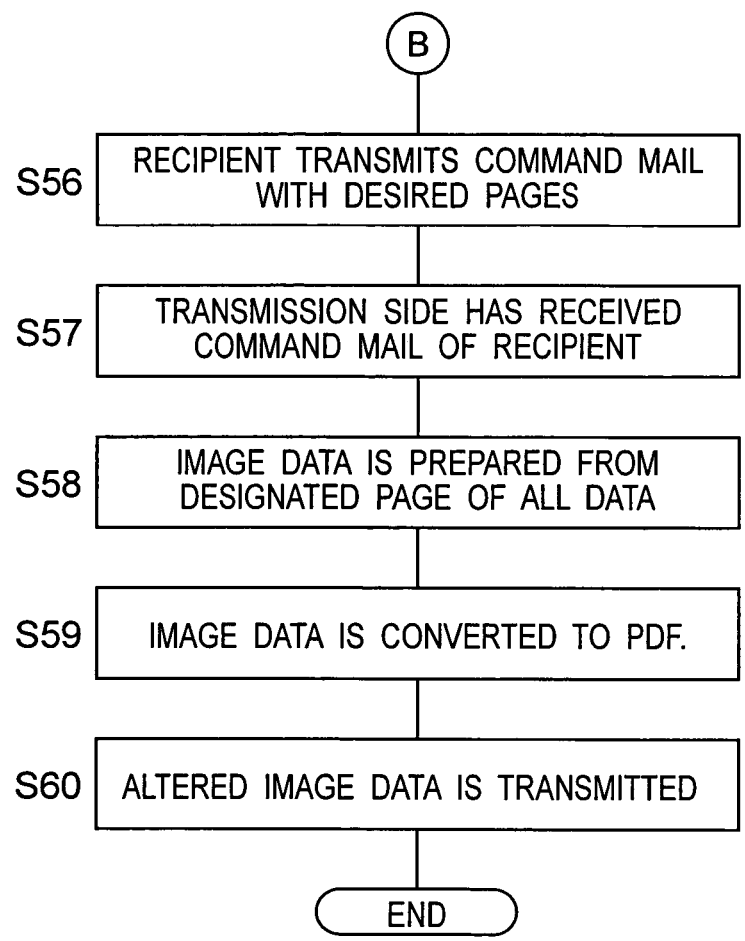
FIG. 17 is a flowchart of an image data transmitting method pertaining to a sixth embodiment of the invention.
Figure 18:
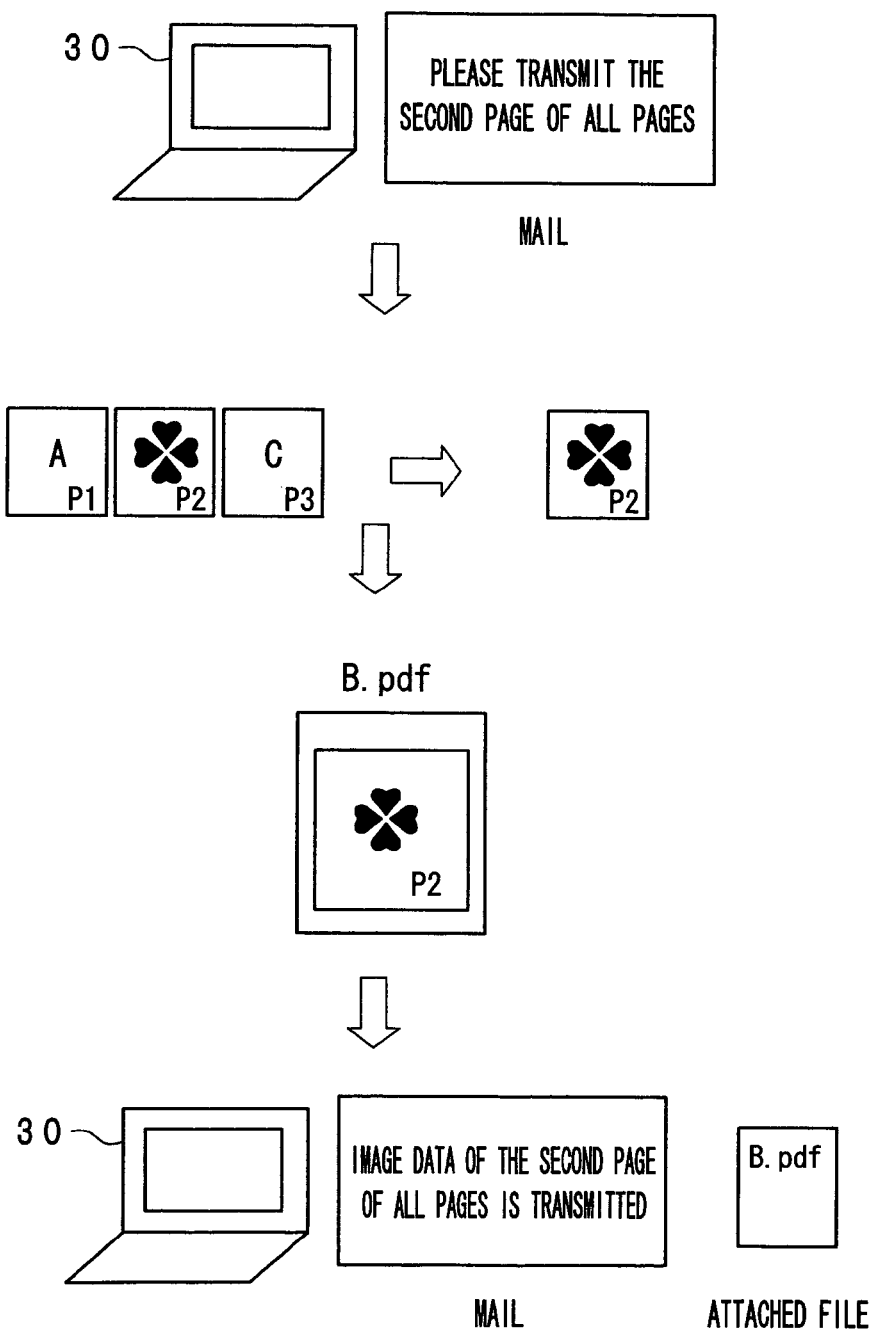
FIG. 18 is a schematic representation showing a concrete example of the image data transmitting method pertaining to the sixth embodiment of the invention.

FIG. 17 is a flowchart of an image data transmitting method pertaining to the sixth embodiment of the invention. FIG. 18 is a representation schematically describing the image data transmitting method of the flowchart of FIG. 17.

(a) A recipient (a transmission destination) 30 transmits a command mail having a desired number of pages (S56). This is an example of the branch B of the flowchart of FIG. 6. In the example of FIG. 18, the command mail contains command information saying "please transmit the second page of all of pages,"

(b) The command mail from the recipient 30 is received on the transmission side (the image data transmitting apparatus) 10 (S57).

(c) Image data of the designated page or pages of all data is prepared based on a command of the transmission destination 30 (S58). In the example of FIG. 18, only the second page is extracted.

(d) The image data of the designated page is converted to a PDF file (B.pdf) (S59).

(e) The converted image data (PDF file:B.pdf) is transmitted to the transmission destination 30 (S60).

In the course of the steps, image data covering a necessary page or pages can be transmitted based on the transmission destination 30.

Seventh Embodiment

Figure 19:
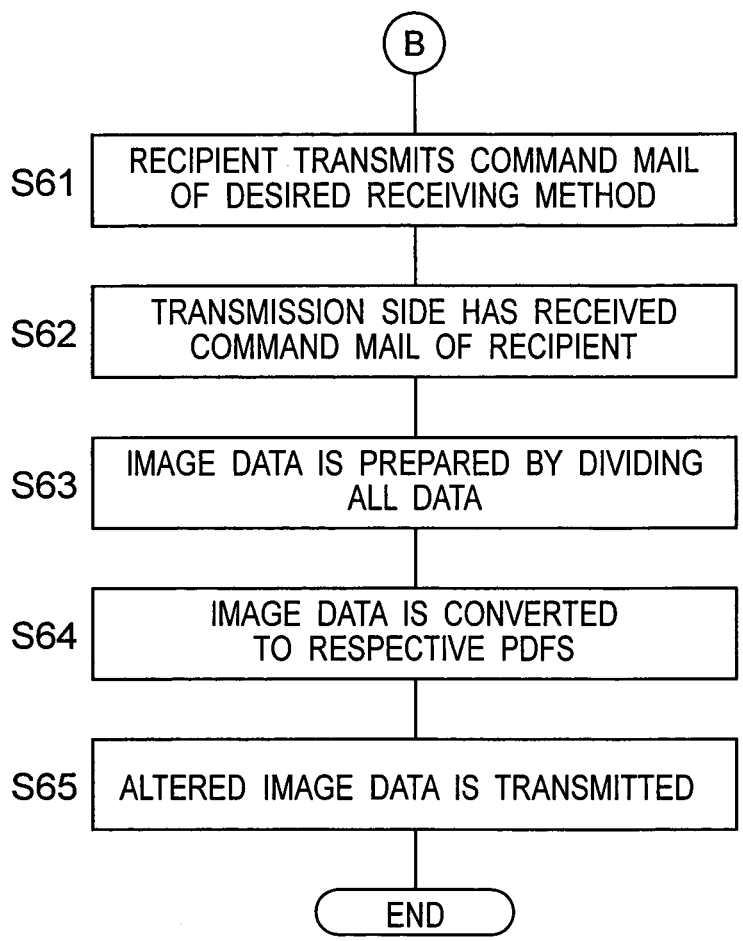
FIG. 19 is a flowchart of an image data transmitting method pertaining to a seventh embodiment of the invention.
Figure 20:
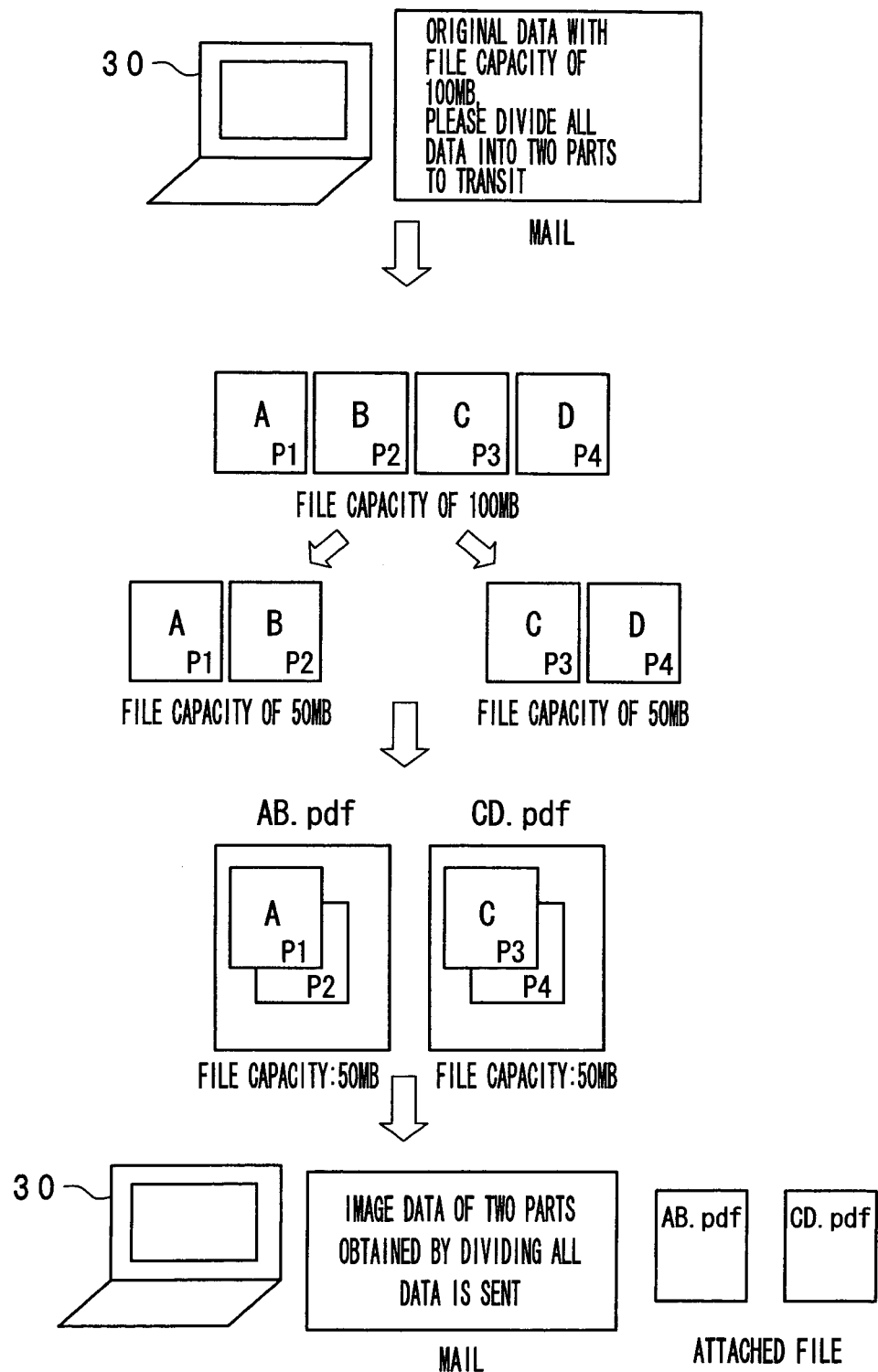
FIG. 20 is a schematic representation showing a concrete example of the image data transmitting method pertaining to the seventh embodiment of the invention.

FIG. 19 is a flowchart of an image data transmitting method pertaining to the seventh embodiment of the invention. FIG. 20 is a representation schematically describing the image data transmitting method the flowchart of FIG. 19.

(a) A recipient (a transmission destination ) 30 transmits a command mail of a desired receiving method (S61). This is an example of the branch B of the flowchart of FIG. 6. In the example of FIG. 20, a command mail includes command information saying "please divide all data into two parts to transmit the parts."

(b) A transmission side (an image data transmitting apparatus) 10 receives a command mail of the recipient 30 (S62).

(c) All the data is divided into parts to prepare image data thereof based on a command of the transmission destination 30 (S63). In the example of FIG. 20, image data including 4 pages in all is divided into two pair of two pages.

(d) The image data including the two pairs of two pages are converted to PDF files (S64). In the example of FIG. 20, the pair of the first and second pages is converted to a PDF file AB.pdf and the pair of the third and fourth pages is converted to a PDF file CD.pdf.

(e) The converted image data (PDF files: AB.pdf and CD.pdf) is transmitted to the transmission destination 30 (S65).

In the course of the steps, the image data obtained by dividing all the data based on command information from the transmission destination 30 can be transmitted.

Eighth Embodiment

Figure 21:
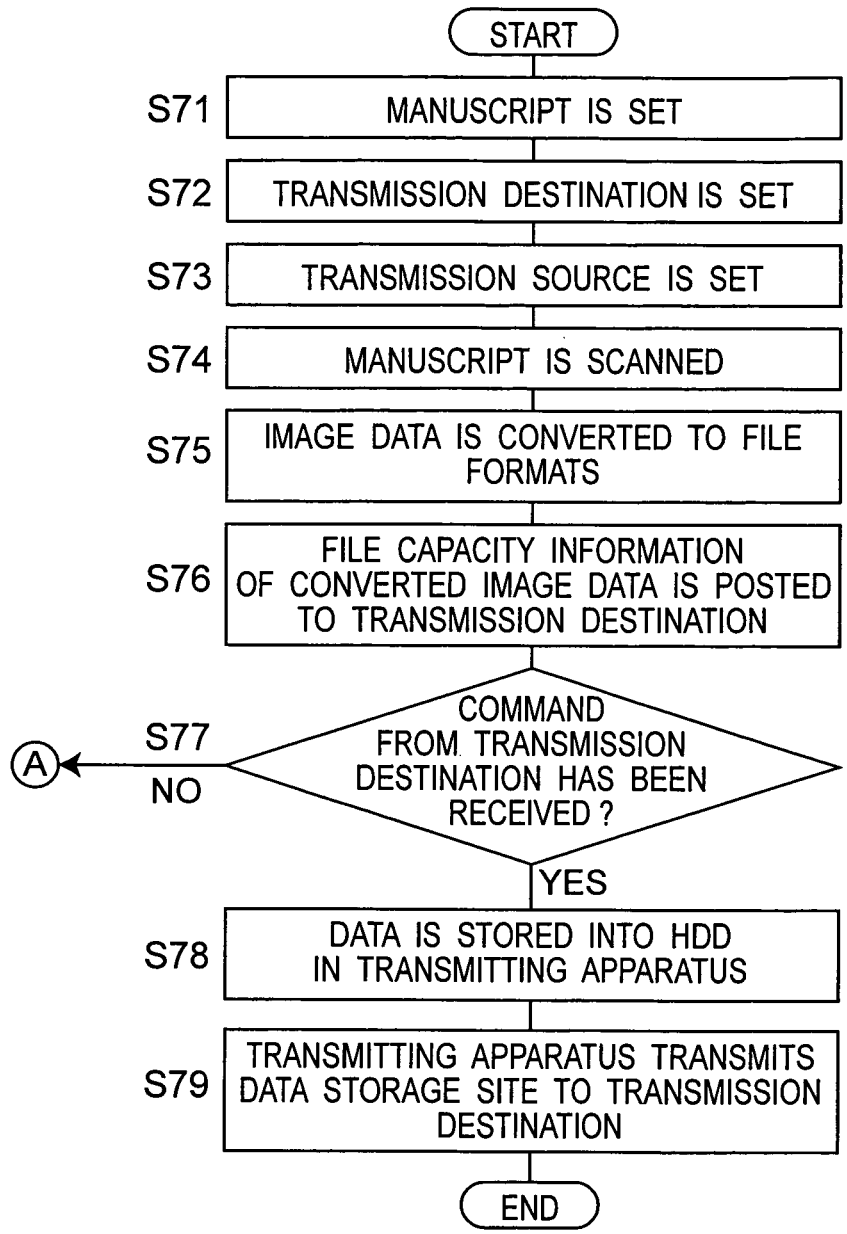
FIG. 21 is a flowchart of an image data transmitting method pertaining to an eighth embodiment of the invention.
Figure 22:
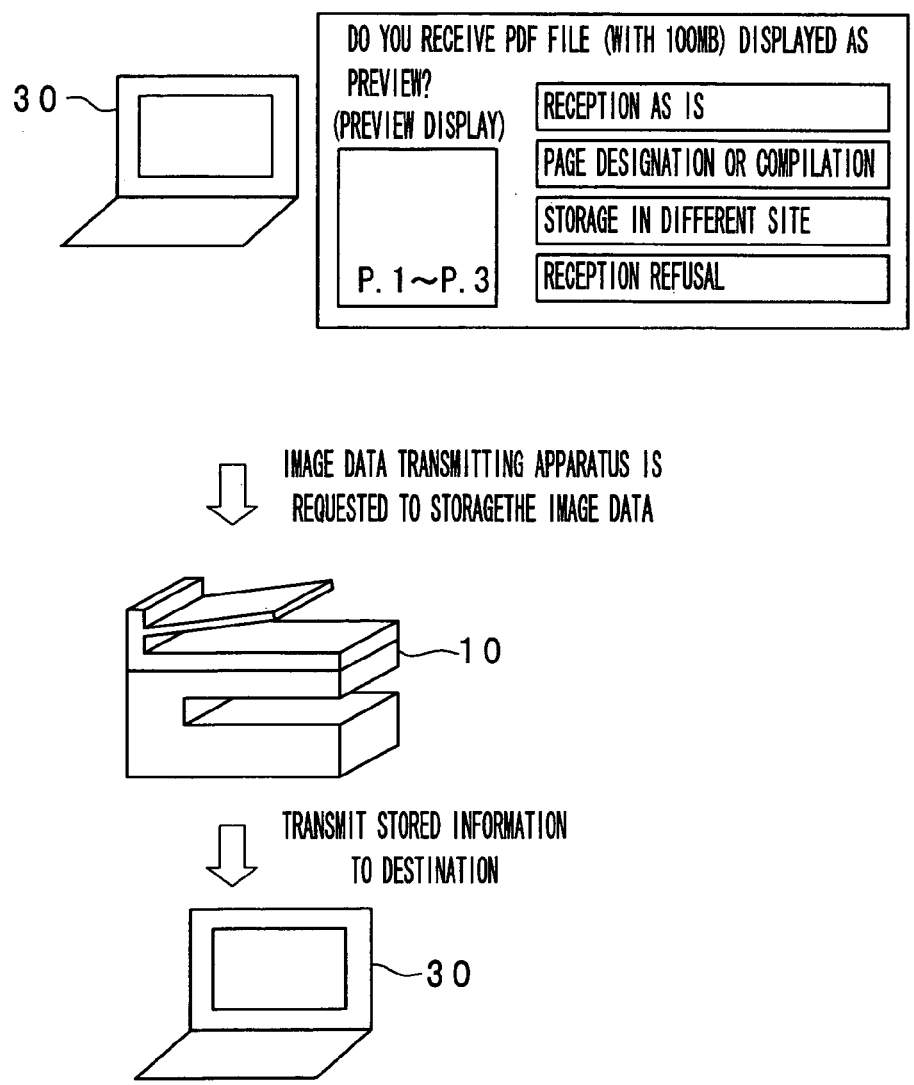
FIG. 22 is a schematic representation showing a concrete example of the image data transmitting method pertaining to the eighth embodiment of the invention.

FIG. 21 is a flowchart of an image data transmitting method pertaining to the eighth embodiment of the invention. FIG. 22 is a representation schematically describing a process from S76 to step S79 in the flowchart of FIG. 21. The image data transmitting method pertains to an example of the branch C of the flowchart of FIG. 6.

(a) A manuscript is set (S71).

(b) A transmission destination 30 is set (S72).

(c) A transmission source 40 us set (S73).

(d) The manuscript is scanned (S74).

(e) Image data is converted to file formats (S75).

(f) Capacity information of image data file after conversion is posted to the transmission destination 30 (S76). A screen image is displayed at the transmission destination 30 as in the example of FIG. 22.

(g) It is determined whether or not a command has been received from the transmission destination 30 (S77). If a command has been received, the process moves to the next step S78. On the other hand, if no command has been received, the process moves to the branch A of FIG. 6. Description will be given of the branch A later.

(h) The process is in a case where a command from the transmission destination 30 is "storage in a different site." This is an example of the branch C in FIG. 6. According to the command, the image converted data file is stored into HDD 4 in the image data transmitting apparatus 10 (S78).

(i) the image data transmitting apparatus 10 transmits a data storage site to the transmission destination 30 (S79). Thereafter, the process is terminated.

In the course of the steps, the data can be stored into the image data transmitting apparatus 10 based on command information from the transmission destination 30.

Ninth Embodiment

Figure 23:
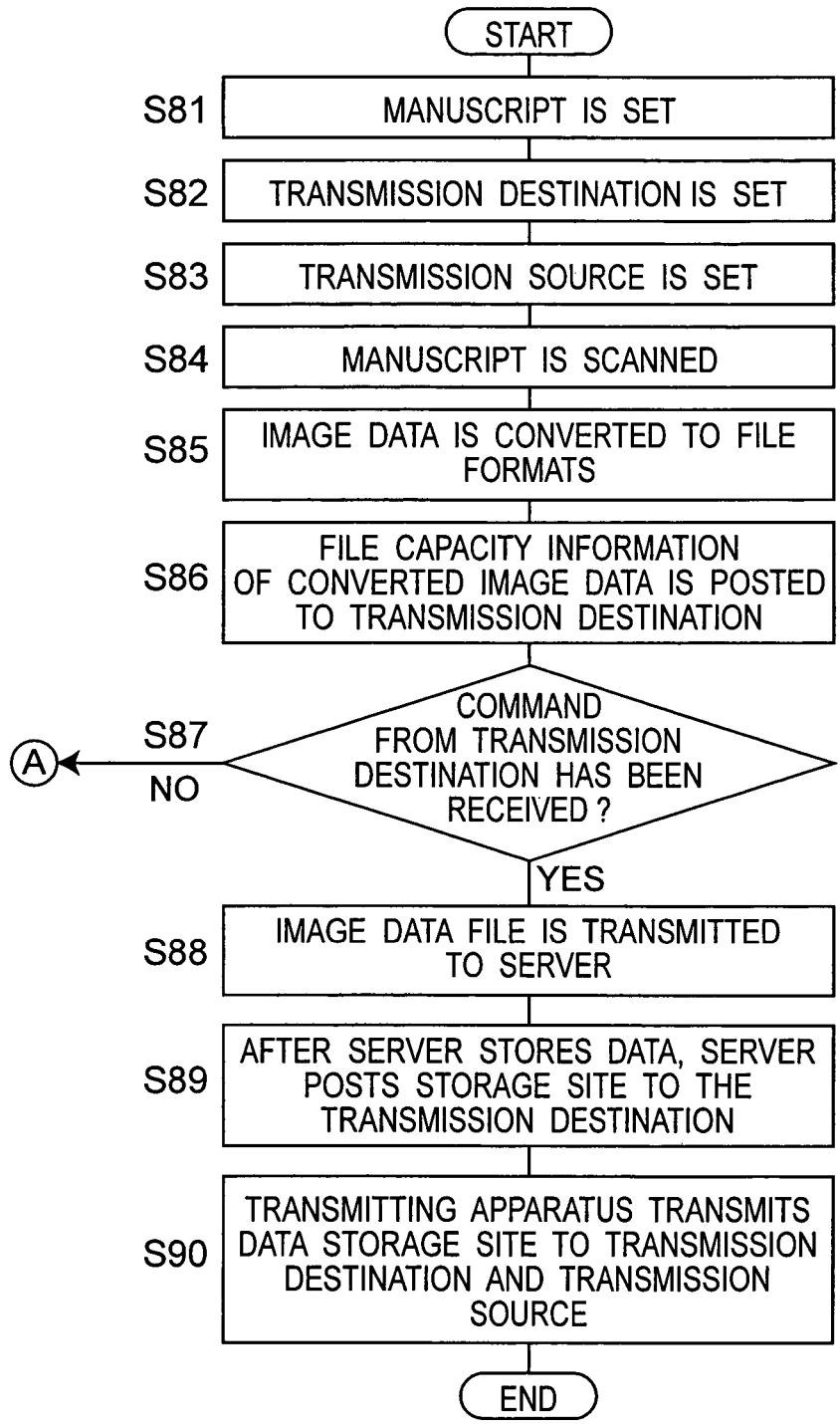
FIG. 23 is a flowchart of an image data transmitting method pertaining to a ninth embodiment of the invention.
Figure 24:
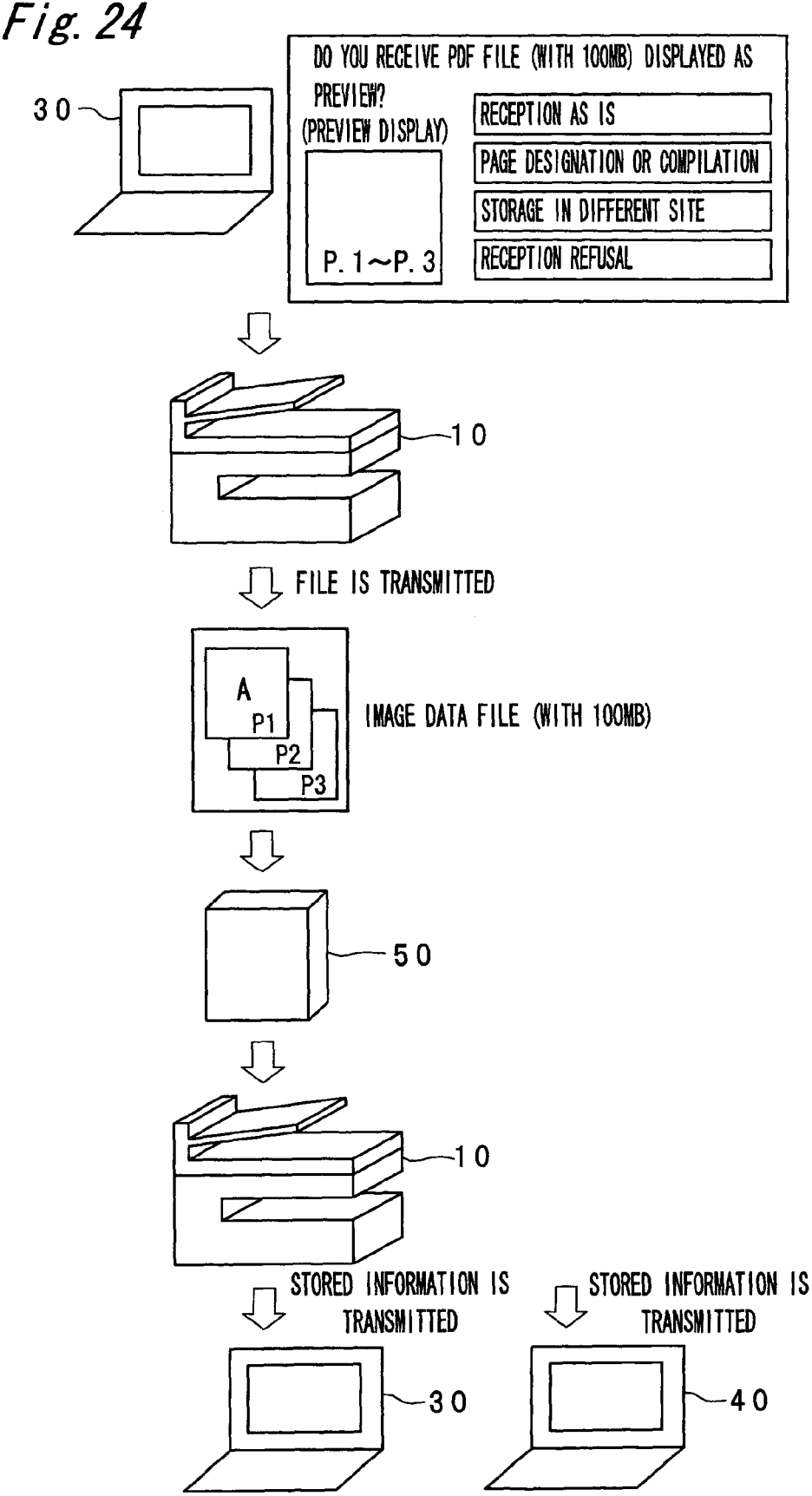
FIG. 24 is a schematic representation showing a concrete example of the image data transmitting method pertaining to the ninth embodiment of the invention.

FIG. 23 is a flowchart of an image data transmitting method pertaining to the ninth embodiment of the invention. FIG. 24 is a representation schematically describing a process from step S86 to step S90 in the flowchart of FIG. 23. The image data transmitting method pertains to an example of the branch C of the flow chart of FIG. 6.

(a) A manuscript is set (S81).

(b) A transmission destination 30 is set (S82).

(c) A transmission source 40 is set (S83).

(d) The manuscript is scanned (S84).

(e) Image data is converted to file formats (S85).

(f) Capacity information of a converted image data file after conversion is posted to the transmission destination 30

(S86). A display is presented on a screen as in the example of FIG. 24 at the transmission destination 30.

(g) It is determined whether or not a command from the transmission destination 30 has been received (S87). If a command has been received, the process moved to the next step S88. On the other hand, if no command has been received, the process moves to the branch A of FIG. 6. The branch A will be described later.

(h) The process is in a case where a command from the transmission destination 30 is "storage in a different site." This is an example of the branch C in FIG. 6. According to the command, the converted image data file is transmitted to a server 50, which is an external storage destination (S88).

(i) After the data is stored at the server 50, the storage site is posted to the image data transmitting apparatus 10 from the server 50 (S89).

(j) The image data transmitting apparatus 10 transmits a data storage site to the transmission destination 30 and the transmission source 40 (S90). Thereafter, the process is terminated.

In the course of the steps, image data can be stored in the server 50, which is an external storage destination, based on command information from the transmission destination 30.

Tenth Embodiment

Figure 25:
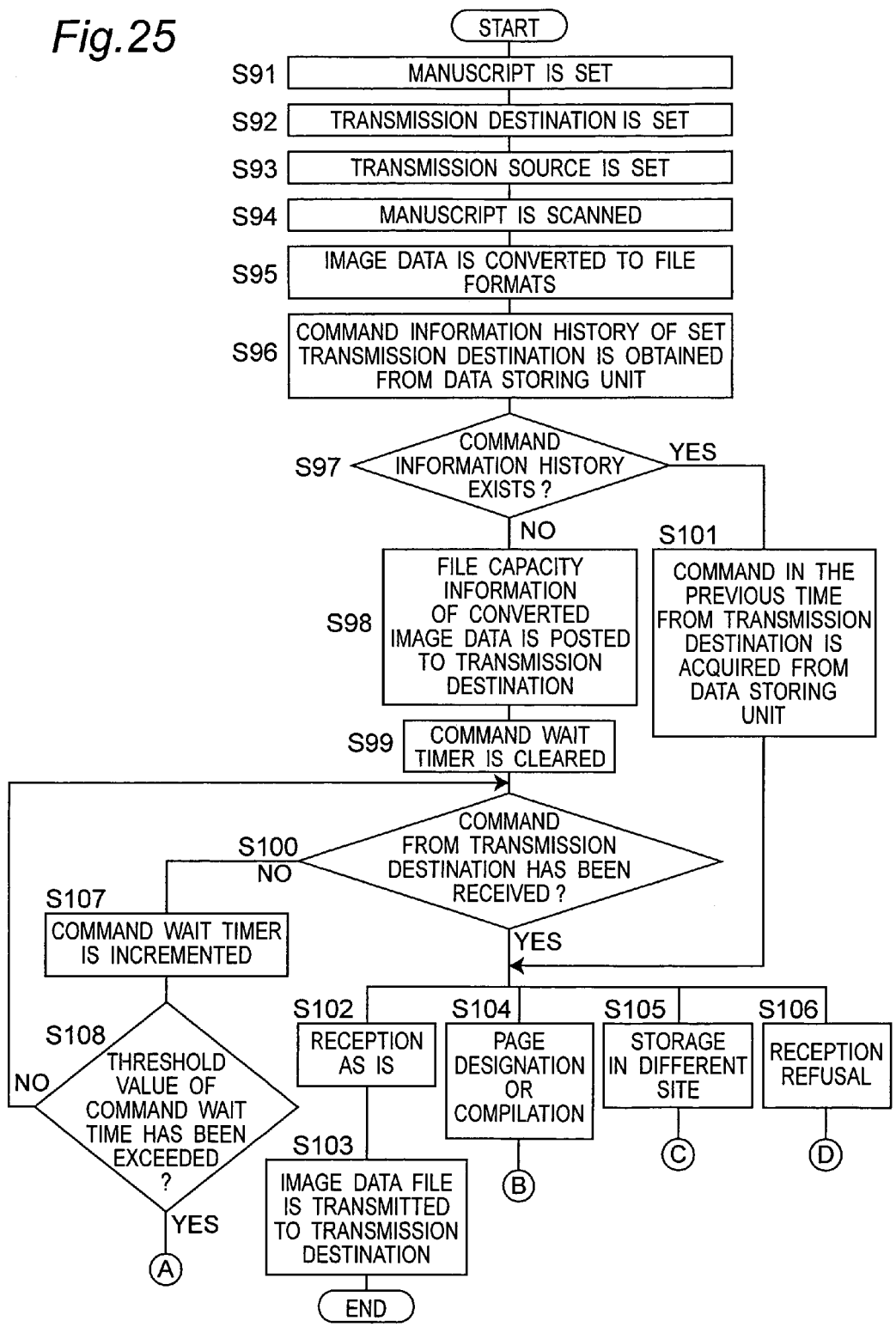
FIG. 25 is a flowchart of an image data transmitting method pertaining to a tenth embodiment of the invention.
Figure 26:
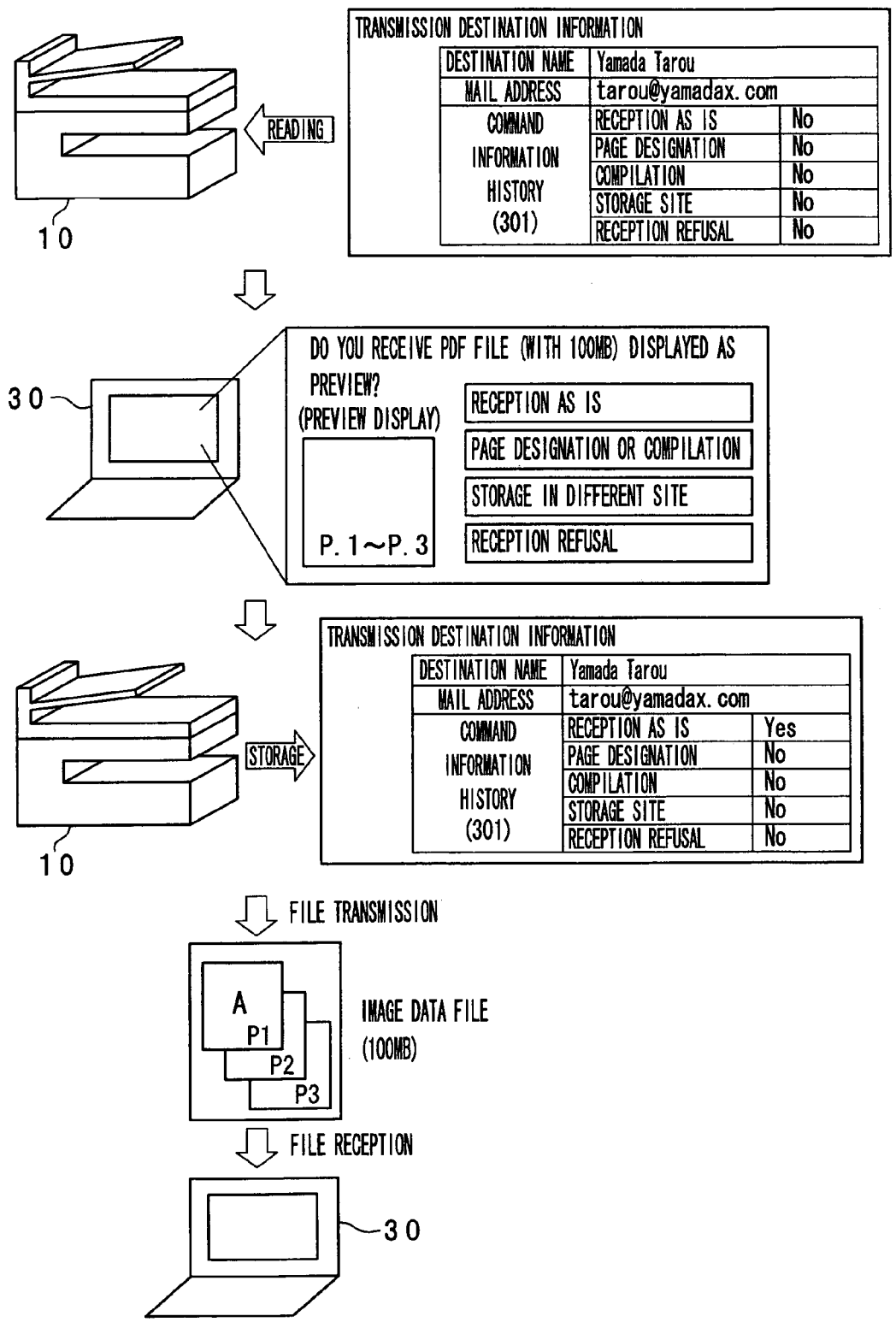
FIG. 26 is a schematic representation showing a concrete example of the image data transmitting method pertaining to the tenth embodiment of the invention.
Figure 27:
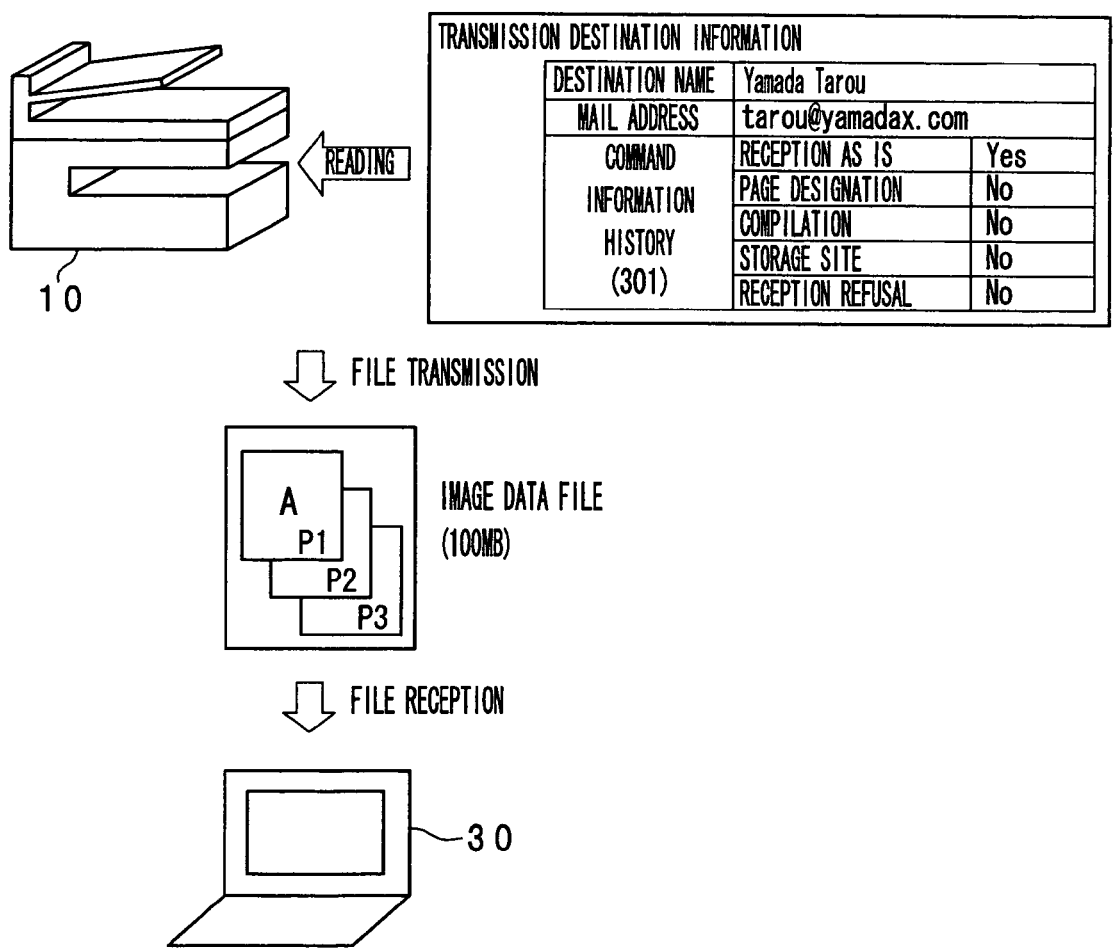
FIG. 27 is a schematic representation showing a concrete example of image data transmitting method in a case where a command information history is present at S97 of the flowchart of FIG. 25.

FIG. 25 is a flowchart of an image data transmitting method pertaining to the tenth embodiment of the invention. FIGS. 26 and 27 are representations schematically describing the image data transmitting method of the flowchart of FIG. 25. FIG. 26 is an example case where no command information history of a transmitting destination 30 is present and FIG. 27 is an example case where a command information history of the transmission destination 30 is present.

(a) A manuscript is set (S91).

(b) A transmission destination 30 is set (S92).

(c) A transmission source 40 is set (S93).

(d) The manuscript is scanned (S94).

(e) Image data is converted to file formats (S95). To be concrete, for example, image data is converted to a PDF file by the image data converting unit 15. File information such as a capacity of a PDF file after conversion is prepared.

(f) A command information history of the set transmission destination 30 is obtained from the data storing unit 14 (S96). In the examples of FIGS. 26 and 27, referred to is a command information history of transmission destination information on a user name, Yamada Tarou, of the transmission destination 30.

(g) It is determined whether or not a command information history of the transmission destination 30 is present (S97). If the command information history is present, the process moves to step S101, while if no command information history is present, the process moves to step S98. In the example of FIG. 26, all the items of the command information history are "No" and no command information history is available. On the other hand, in the example of FIG. 27, there is present a command information history on a user name: Yamada Tarou, of the transmission destination 30.

(h) Capacity information of an image data file after conversion is posted to the transmission destination 30 (S98). At the transmission destination 30, a display is presented on a screen as shown in the example of FIG. 26.

(i) the command wait timer is cleared (S99)

(j) It is determined whether or not a command from the transmission destination 30 has been received (S100). If the command has been received, the process is branched out into one of the steps of S102, S104, S105 and S106 according to the command. On the other hand, if no command has been received, the process moves to step S107.

(k-1) The process is in a case where a command of "reception as is" has been received from the transmission destination 30 (S102). In this case, the item of "reception as is" of a command information history is rewritten to "Yes" as shown in FIG. 26.

(l-1) Image data file is transmitted to the transmission destination 30 (S103). Thereafter the process is terminated.

(k-2) The process is in a case where a command of "page designation or compilation" has been received from the transmission destination 30 (S104). In this case, the item of "page designation and compilation" of a command information history is rewritten to "Yes." Thereafter, the process moves to the branch B.

(k-3) The process is in a case where a command of "storage in a different site" has been received from the transmission destination 30 (S105). In this case, the item of "storage in a different site" of a command information history is rewritten to "Yes." Thereafter, the process moves to the branch C.

(k-4) The process is in a case where a command of "reception refusal" has been received from the transmission destination 30 (S106). In this case, the item of "reception refusal" of a command information history is rewritten to "Yes." The branch D is a processing for interrupting file transmission and thereafter the process is terminated.

(m) In a case where no command has been received in step S100, the command wait timer is incremented (S107).

(n) It is determined whether or not it has exceeded a threshold value of a command wait time (S108). If the threshold value has been exceeded, the process moves to the branch A described later. On the other hand, if the threshold value has not been exceeded, the process returns to step S100 of determining command reception from transmission destination.

(o) In a case where a command information history of the transmission destination 30 is present in step S97, command information of the transmission destination 30 in the previous time is acquired from the data storing unit 14 (S101). Thereafter, the process moves to one of S102, S104, S105 and S106 according to which type the command is of. In the example of FIG. 27, the item of "reception as is" as a command information history is "Yes"; therefore, the process moves to step S102 and image data file is transmitted to the transmission destination 30.

In the course of the step, in a case where a command has been received in advance from the transmission destination 30, image data can be transmitted to the transmission destination 30 based on the command information history.

Eleventh Embodiment

Figure 28:
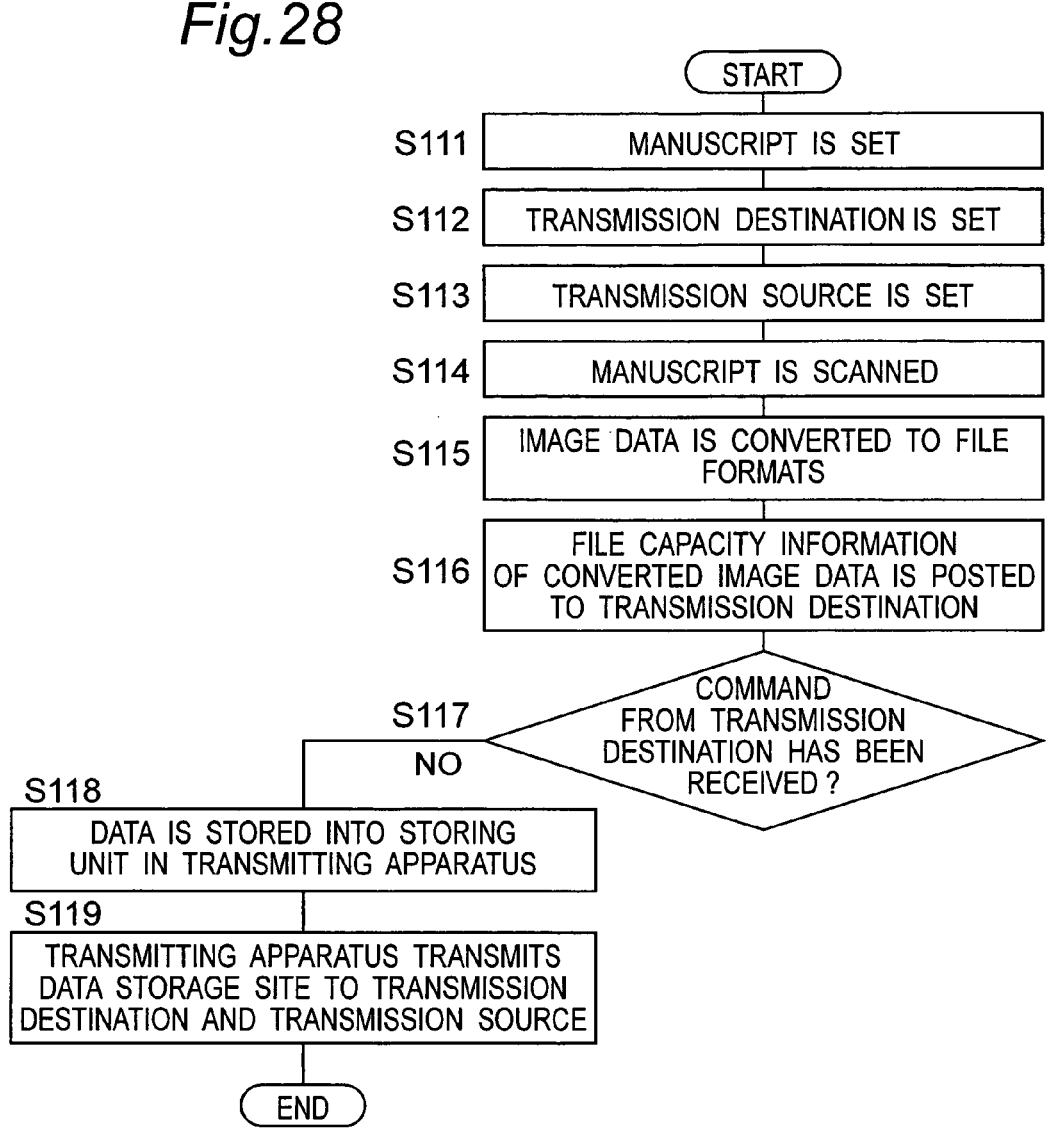
FIG. 28 is a flowchart of an image data transmitting method pertaining to an eleventh embodiment of the invention.
Figure 29:
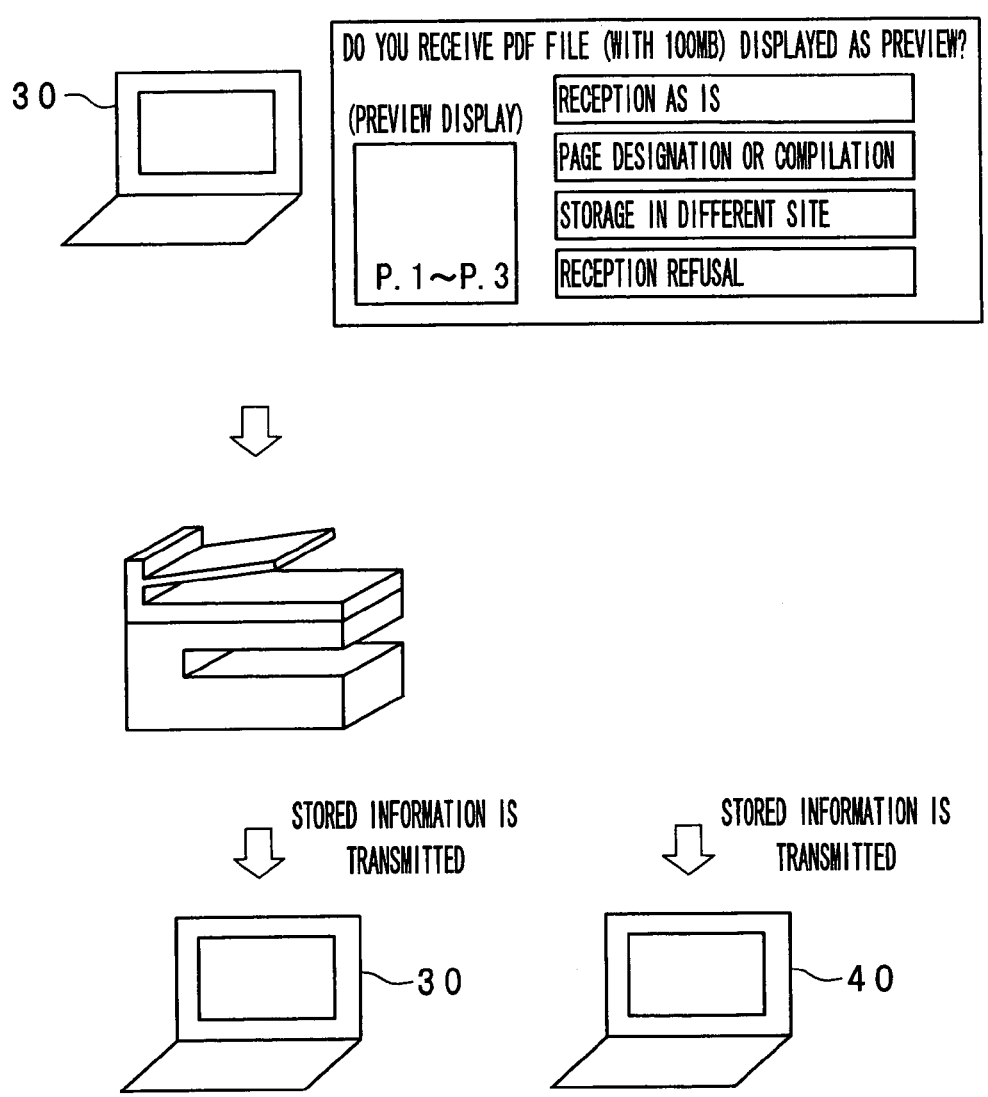
FIG. 29 is a schematic representation showing a concrete example of the image data transmitting method pertaining to the eleventh embodiment of the invention.

FIG. 28 is a flowchart of an image data transmitting method pertaining to the eleventh embodiment of the invention. FIG. 29 is a representation schematically describing the image data transmitting method of the flow chart of FIG. 28. The image data transmission method pertains to an example of the branch A of the flowchart of FIG. 6.

(a) A manuscript is set (S11).

(b) A transmission destination 30 is set (S112).

(c) A transmission source 40 is set (S113).

(d) The manuscript is scanned (S114).

(e) Image data is converted to file formats (S15).

(f) Capacity information of converted image data file is posted to the transmission destination 30 (S116). At the transmission site 30, a display is presented on a screen as shown in the example of FIG. 29.

(g) It is determined whether or not a command from the transmission destination 30 has been received (S117). If the command has been received, the process moves to one of steps S09, S11, S12 and S13 of FIG. 6. On the other hand, if no command has been received, the process moves to the next step S118. Note that this case corresponds to an example of the branch A shown in FIG. 6.

(h) A image converted data file is stored into the HDD4 in the image data transmitting apparatus 10 as a default setting in a case where the command has not been received from the transmission destination (S118). Note that setting of the branch A is not limited to the setting and may be replaced with another setting.

(i) The image data transmitting apparatus 10 transmits a data storage site to the transmission destination 30 and the transmission source 40 (S119). Thereafter, the process is terminated.

In the course of the step, default setting is made in advance; thereby enabling even a case where no command has been received from the transmission destination 30 to be dealt with.

Twelfth Embodiment

Figure 30:
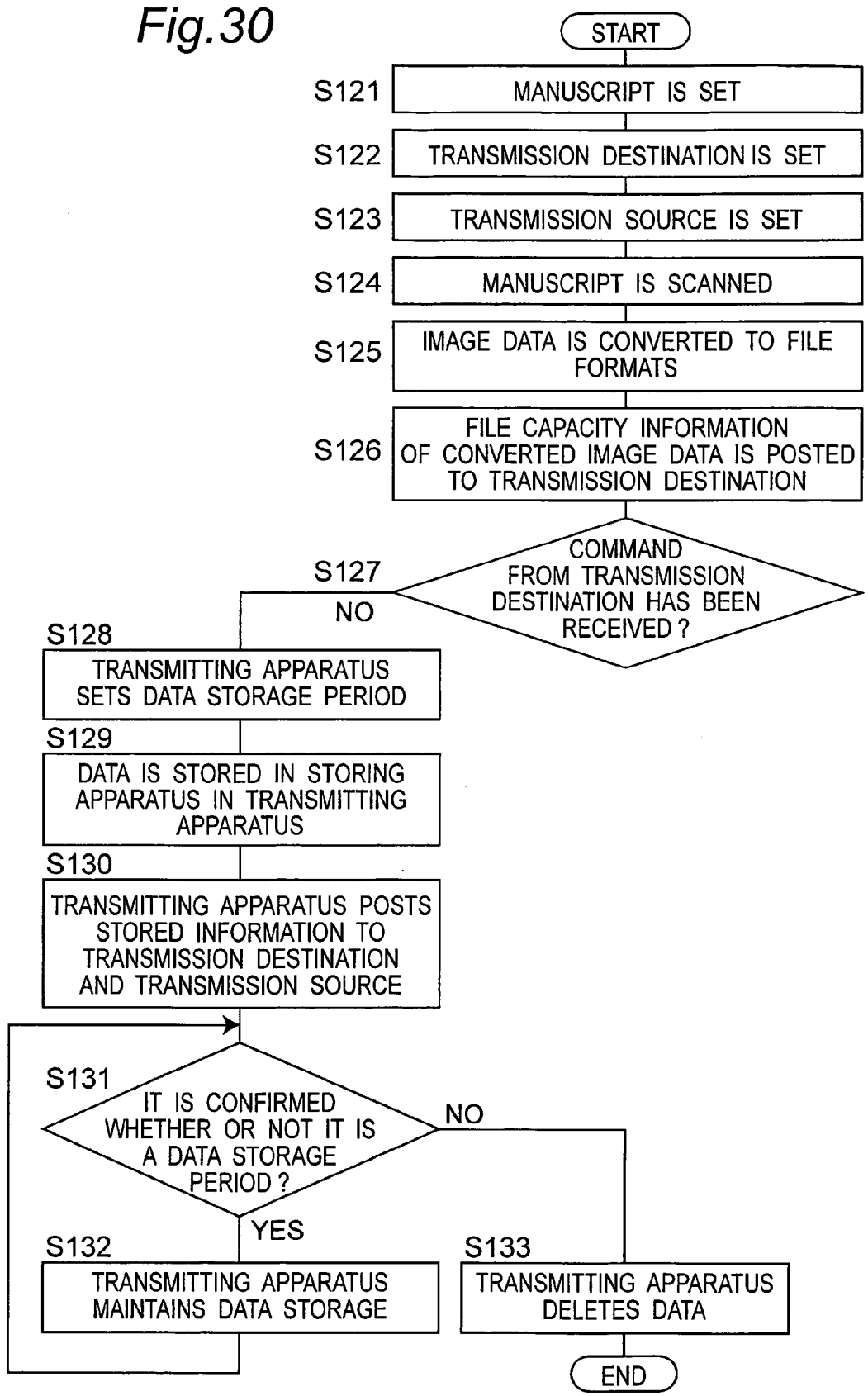
FIG. 30 is a flowchart of an image data transmitting method pertaining to a twelfth embodiment of the invention.
Figure 31:
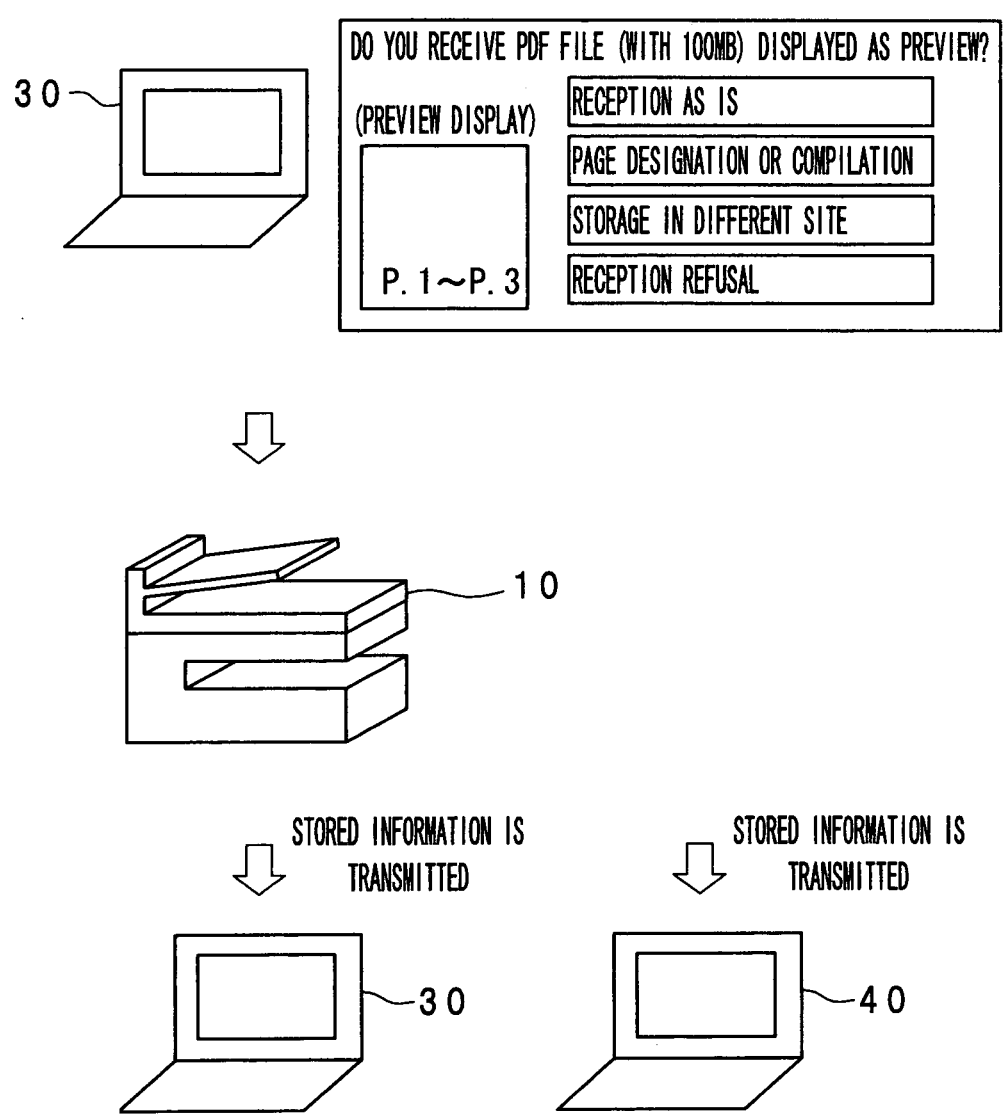
FIG. 31 is a schematic representation showing a concrete example of the image data transmitting method pertaining to the twelfth embodiment of the invention.

FIG. 30 is a flowchart of an image data transmitting method pertaining to the twelfth embodiment of the invention. FIG. 31 is a representation schematically describing the image data transmitting method of the flowchart of FIG. 30. The image data transmitting method pertains to an example of the branch A of the flowchart of FIG. 6.

(a) A manuscript is set (S121).

(b) A transmission destination 30 is set (S122).

(c) A transmission source 40 is set (S123).

(d) The manuscript is scanned (S124).

(e) Image data is converted to file formats (S125).

(f) Capacity information of image data file after conversion is posted to the transmission destination 30 (S126). At the transmission site 30, a display is presented on a screen as shown in the example of FIG. 31.

(g) It is determined whether or not a command from the transmission destination 30 has been received (S127). If the command has been received, the process moves to one of steps S09, S11, S12 and S13 of FIG. 6. On the other hand, if no command has been received, the process moves to the next step S128. Note that this case corresponds to an example of the branch A shown in FIG. 6.

(h) A data storage period is set in the image data transmitting apparatus 10 (S128).

(i) The image converted data file is stored into the HDD4 in the image data transmitting apparatus 10 (S129).

(j) The transmitting apparatus 10 transmits a data storage site to the transmission destination 30 and the transmission source 40 (S130).

(k) It is confirmed whether or not it is within the storage period (S131).

(l) If it is within the storage period, storing the image converted data file is maintained in the transmitting apparatus 10 (S132). Thereafter, the process returns to step S131.

(m) if it has exceeded the storage period, data is deleted in the transmitting apparatus 10 (S133). Thereafter, the process is terminated.

In the course of the steps, even if no command has been issued from the transmission destination 30, the data is deleted when the set storage period elapses, thereby enabling a load on management in the image data transmitting apparatus 10 to be alleviated.

Thirteenth Embodiment

Figure 32:
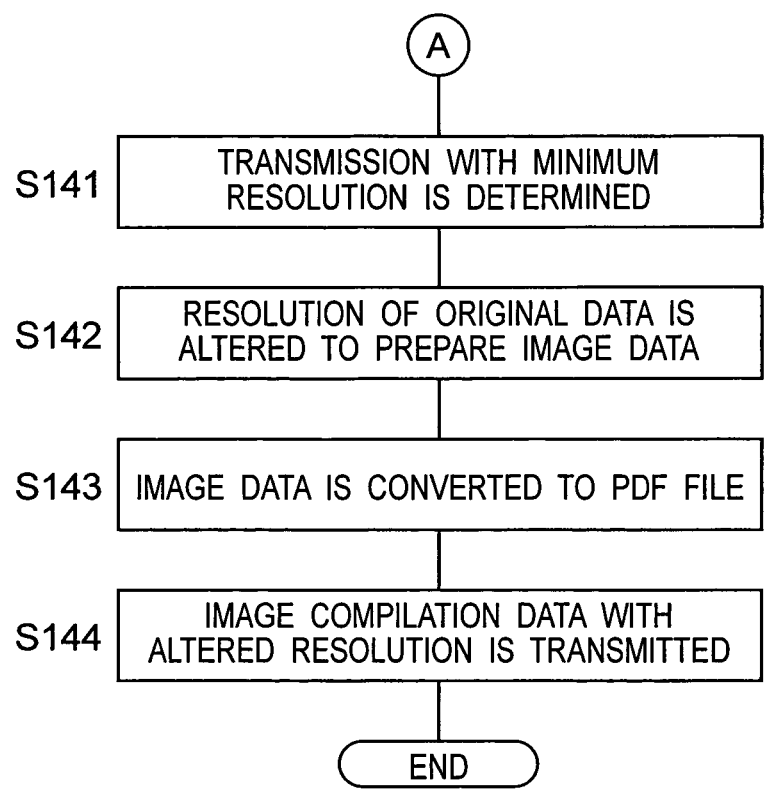
FIG. 32 is a flowchart of an image data transmitting method pertaining to a thirteenth embodiment of the invention.
Figure 33:
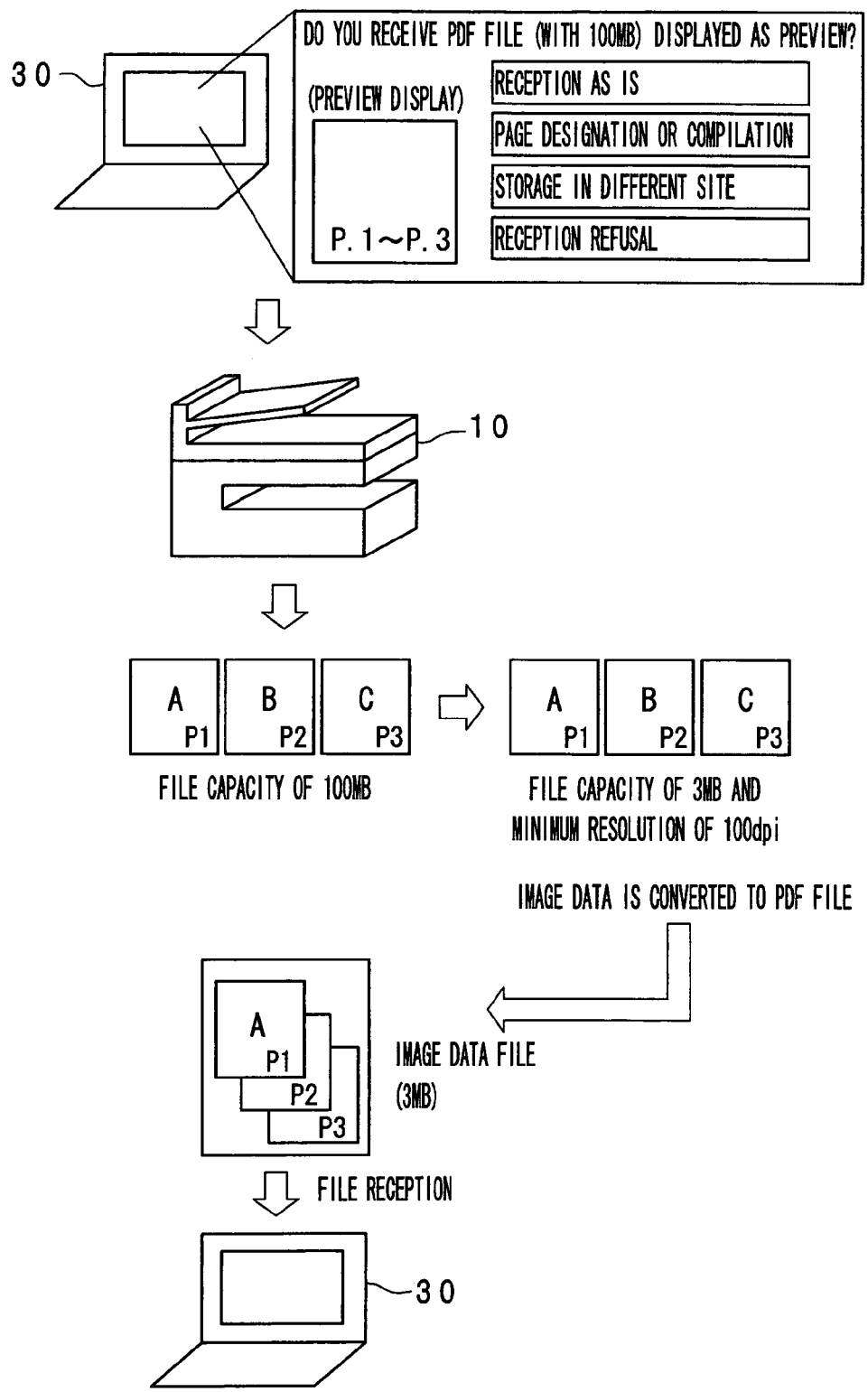
FIG. 33 is a schematic representation showing a concrete example of the image data transmitting method pertaining to the thirteenth embodiment of the invention.

FIG. 32 is a flowchart of an image data transmitting method pertaining to the thirteenth embodiment of the invention. FIG. 33 is a representation schematically describing the flowchart of FIG. 32. The image data transmitting method pertains to the branch A of the flowchart of FIG. 6.

(a) The process is in the branch A of FIG. 6.

(b) It is determined that image data is transmitted to the transmission destination 30 with the minimum resolution (S141). In the example of FIG. 33, the minimum resolution is set 100 dpi.

(c) A resolution of original data is altered to prepare image data. (S142).

(d) The image data is converted to a PDF file (S143). In the example of FIG. 33, a PDF file with 3 MB is obtained.

(e) Image compilation data with an altered resolution is transmitted (S 144). Thereafter, the process is terminated.

In the course of the steps, since even if no command has been received from the transmission destination, image data with the minimum resolution is transmitted, not only can reception load be alleviated even at the transmission destination 30, but a load on the network 20 can also be reduced.

Fourteenth Embodiment

Figure 34:
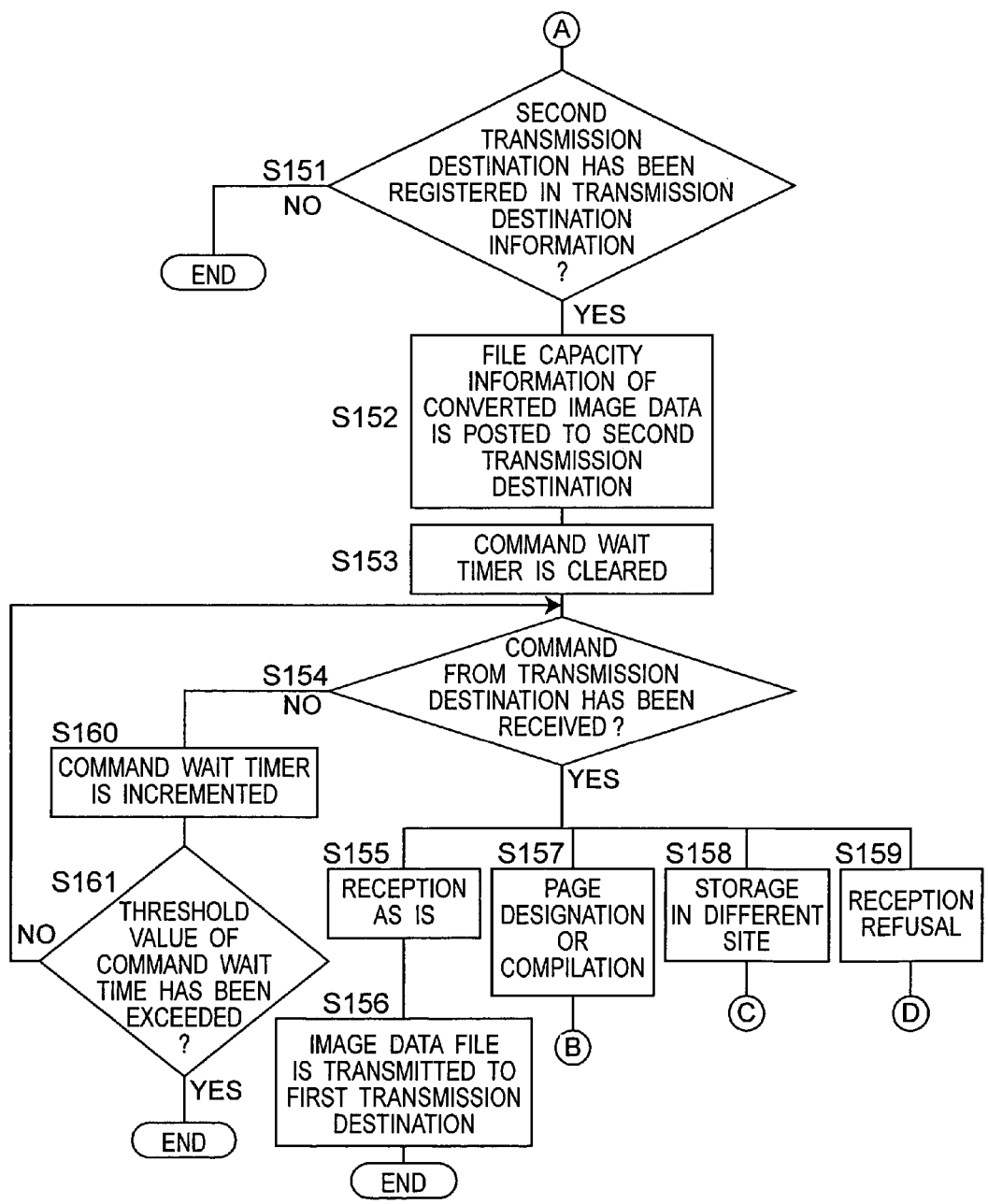
FIG. 34 is a flowchart of an image data transmitting method pertaining to a fourteenth embodiment of the invention.
Figure 35:
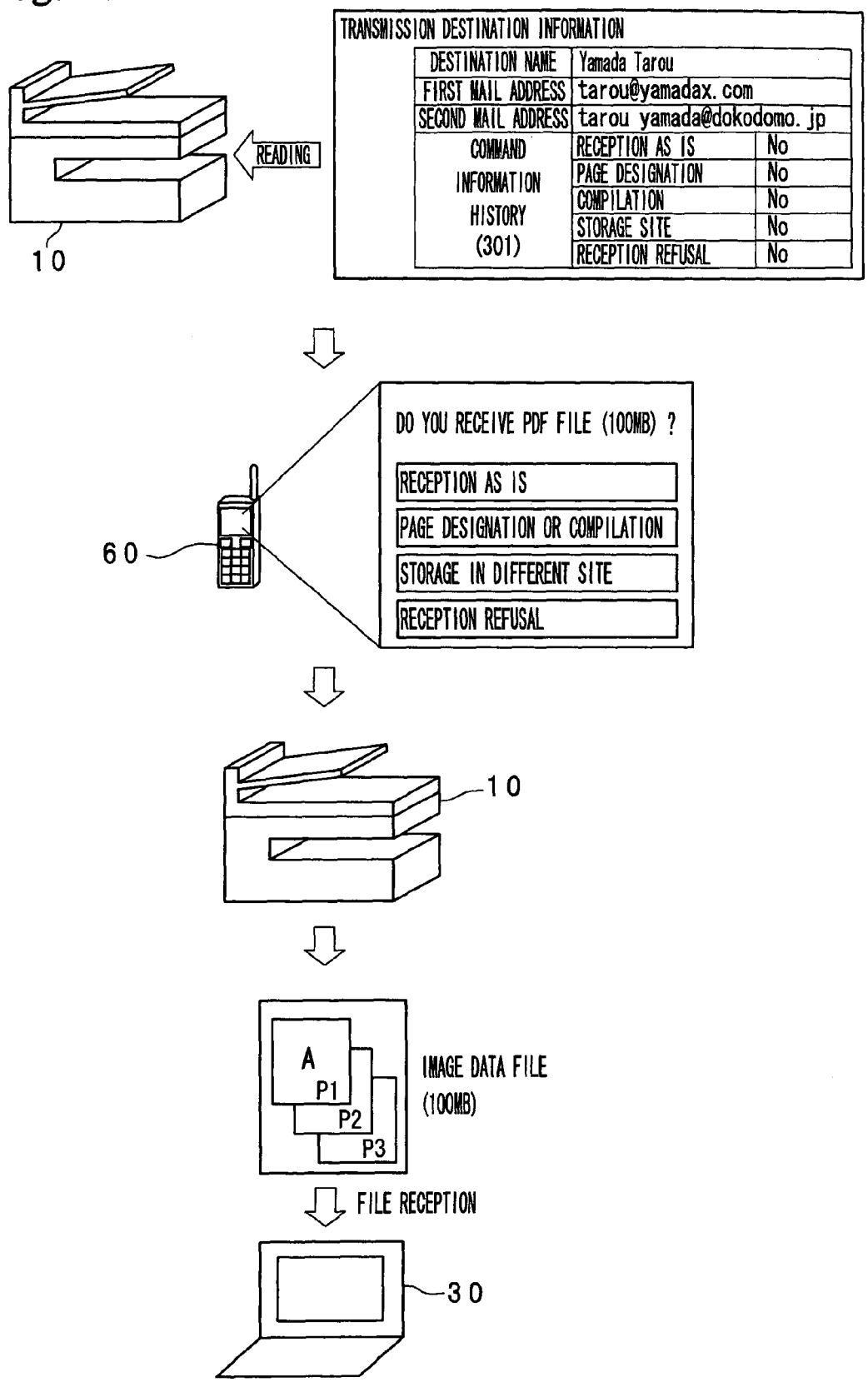
FIG. 35 is a schematic representation showing a concrete example of the image data transmitting method pertaining to the fourteenth embodiment of the invention.

FIG. 34 is a flowchart of an image data transmitting method pertaining to the fourteenth embodiment of the invention. FIG. 35 is a representation schematically describing the flowchart of FIG. 34. This image data transmitting method pertains to the branch A of the flowchart of FIG. 6.

(a) The process is in the branch A of the flowchart of FIG. 6.

(b) It is confirmed whether or not a second transmission destination has been registered in transmission destination information (S151). If the second transmission destination has been registered, the process moves to the next step S152. On the other hand, if the second transmission destination has not been registered, the process is terminated as is. In the example of FIG. 35, referred to is the item of "a second mail address" in transmission destination information of the transmission destination 30.

(c) Capacity information of a converted image data file after conversion is posted to the second transmission destination (S152). In the example of FIG. 35, since "tarou_yamada@docodemo.jp" is recorded as the second mail address, the second mail address is acquired as the second transmission destination 60, which is posted to the second transmission destination. In the second transmission destination 60, a received message is displayed on a screen as shown in FIG. 35.

(d) The command wait timer is cleared (S153).

(e) It is confirmed whether or not a command from the transmission destination 60 has been received (S154). If the command has been received, the process is branched out into one of S155, S157, S158 and S159 according to the command. On the other hand, if no command has been received, the process moves to step S160.

(f-1) The process is in a case where a command of "reception as is" from the transmission destination 60 has been received (S155).

(g-1) An image data file is transmitted to the transmission destination (S156). Thereafter, the process is terminated.

(f-2) The process is in a case where a command of "page designation or compilation" has been received from the transmission destination 60 (S157). In this case, the process is branched out into the branch B.

(f-3) The process is in a case where a command of "storage in a different site" has been received from the transmission destination 60. (S158). In this case, the process moves to the branch C.

(f-4) The process is in a case where a command of "reception refusal" has been received from the transmission destination 60 (S159). In this case, the branch D is a processing for conducting file transmission interruption and thereafter, the process is terminated.

(h) If no command has been received in step S154, the command wait timer is incremented (S160).

(i) It is determined whether or not it has exceeded a threshold value of a command wait time (S161). If the threshold value has been exceeded, the process is terminated. On the other hand, if no threshold value has been exceeded, the process returns to step S154 of determining command reception from the transmission destination.

In the course of the steps, a message is posted to the second transmission destination 60 such as a portable telephone, thereby enabling a user to be aware of the message even if the user is remote from the transmission destination 30.

Fifteenth Embodiment

Figure 36:
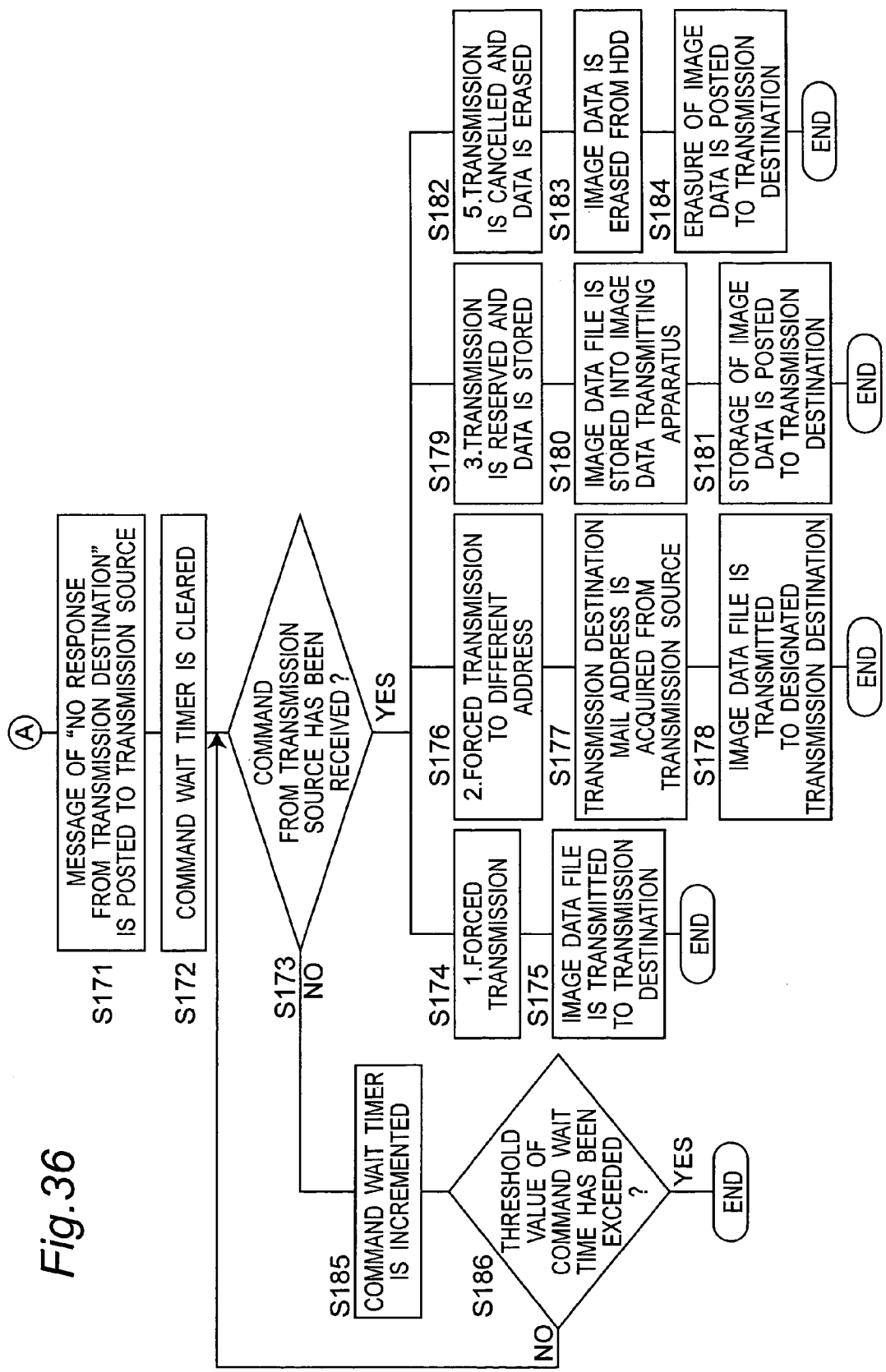
FIG. 36 is a flowchart of an image data transmitting method pertaining to a fifteenth embodiment of the invention.
Figure 37:
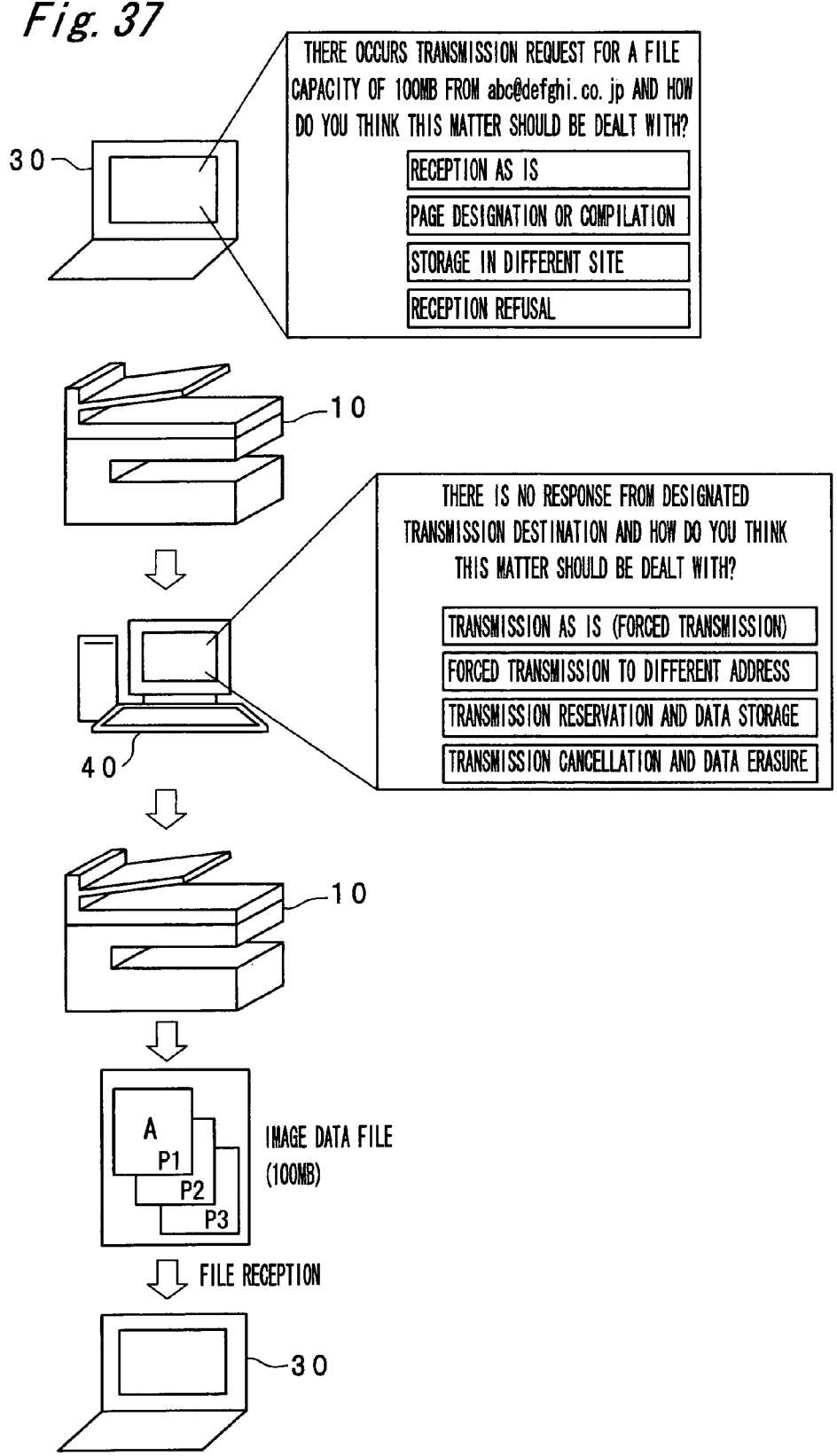
FIG. 37 is a schematic representation showing a concrete example of the image data transmitting method pertaining to the fifteenth embodiment of the invention.

FIG. 36 is a flowchart of an image data transmitting method pertaining to the fifteenth embodiment of the invention. FIG. 37 is a representation schematically describing the flowchart of FIG. 36. The image data transmitting method pertains to the branch A of the flowchart of FIG. 6.

(a) The process is in the branch A of the flowchart of FIG. 6.

(b) A message of "no response from the transmission destination" is posted to the transmission source 40 (S171). In the transmission source 40, a display is presented on a screen as shown in FIG. 37.

(c) The command wait timer is cleared (S172).

(d) It is determined whether or not a command from the transmission source 40 has been received (S173). If the command has been received, the process is branched out into one of S174, S176, S179 and S182. On the other hand, if no command has been received, the process move to step S185.

(e-1) The process is in a case where a command of "transmission as is (forced transmission)" has been received from the transmission source 40 (S174).

(f-1) An image data file is transmitted to the transmission destination 30 (S175). Thereafter, the process is terminated.

(e-2) The process is in a case where a command of "forced transmission to a different address" has been received from the transmission source 40 (S176).

(f-2) A transmission destination mail address is acquired from the transmission source 40 (S177).

(g-2) The image data file is transmitted to a designated transmission destination (S178). Thereafter, the process is terminated.

(e-3) The process is in case where a command of "transmission reservation and data storage" has been received from the transmission source 40 (S179).

(f-3) The image data file is stored into the image data transmitting apparatus 10 (S180).

(g-3) Storage of the image data is posted to the transmission destination 30 (S181).

(e-4) The process in a case where a command of "transmission cancellation, data erasure" has been received from the transmission source 40 (S182).

(f-4) The image data is erased from HDD4 (S183).

(g-4) Erasure of the image data is posted to the transmission destination 30. Thereafter, the process is terminated.

(h) If a command from the transmission source 40 has not been received in step S173, the command wait timer is incremented (S185).

(i) It is determined whether or not it has exceeded a threshold value of a command wait time (S186). If the threshold value has been exceeded, the process is terminated. On the other hand, if the threshold has not been exceeded, the process returns to step S173 of determining command reception from the transmission destination.

In the course of the steps, even if a command from the transmission destination 30 cannot be received, the disability of command reception is posted to the transmission source 40 and image data can be transmitted to the transmission destination 30 based on command information from the transmission source 40.

An image data transmitting apparatus pertaining to the invention can be applied to the image data transmitting apparatus transmitting image data to the receiving apparatus through a network.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image data transmitting apparatus transmitting image data to a receiving apparatus through a network, comprising:
    an image data converting unit for converting the image data to a converted image data file;
    a preparing unit for preparing file information of the converted image data file;
    a posting unit for posting information including options of a receiving method for receiving the converted image data file on the receiving apparatus according to the file information to the receiving apparatus;
    a receiving unit for receiving command information concerning a selected receiving method for receiving the converted image data file on the receiving apparatus according to the information including options from the receiving apparatus;
    a transmission controlling unit for transmitting the converted image data file to the receiving apparatus based on the command information; and
    an image data compiling unit for compiling the converted image data based on the command information,
    wherein when the received command information corresponds to the command information for requesting the converted image data file having changed file capacity, the compiling unit prepares image compiling data files obtained by altering a resolution of the converted image data file based on the command information, and
    the transmission controlling unit transmits the image compilation data file to the receiving apparatus.

2. The image data transmitting apparatus according to claim 1, wherein the transmission controlling unit transmits a converted image data file containing only a necessary page or pages to the receiving apparatus based on the command information.

3. The image data transmitting apparatus according to claim 1, wherein the transmission controlling unit divides the converted image data file based on the command information to transmit the data files with a smaller capacity after the division to the receiving apparatus.

4. An image data transmitting apparatus transmitting image data to a receiving apparatus through a network, comprising:
    an image data converting unit for converting the image data to a converted image data file;
    a preparing unit for preparing file information of the converted image data file;
    a posting unit for posting information including options of a receiving method for receiving the converted image data file on the receiving apparatus according to the file information to the receiving apparatus;
    a receiving unit for receiving command information concerning a selected receiving method for receiving the converted image data file on the receiving apparatus according to the information including options from the receiving apparatus; and a transmission controlling unit for transmitting the converted image data file to the receiving apparatus based on the command information, wherein when the received command information corresponds to the command information for requesting storing in a different site, the transmission controlling unit stores the converted image data file into a given storage destination that is external to the image data transmitting apparatus based on the command information and transmits storage information concerning the storage destination to the receiving apparatus.

5. An image data transmitting apparatus transmitting image data to a receiving apparatus through a network, comprising:

an image data converting unit for converting the image data to a converted image data file;

a preparing unit for preparing file information of the converted image data file;

a posting unit for posting information including options of a receiving method for receiving the converted image data file on the receiving apparatus according to the file information to the receiving apparatus;

a receiving unit for receiving command information concerning a selected receiving method for receiving the converted image data file on the receiving apparatus according to the information including options from the receiving apparatus; and a transmission controlling unit for transmitting the converted image data file to the receiving apparatus based on the command information, wherein after a given time elapses from the time when the information including options of a receiving method for receiving the converted image data file is posted to the receiving apparatus by the posting unit, if the command information has not yet been received from the receiving apparatus, the transmission controlling unit stores the converted image data file in a given storage destination and posts storage information concerning the storage destination to the receiving apparatus, and if the command information has been received from the receiving apparatus within the given time, the transmission controlling unit transmits the converted image data file to the receiving apparatus based on the command information.

6. An image data transmitting apparatus transmitting image data to a receiving apparatus through a network, comprising:

an image data converting unit for converting the image data to a converted image data file;

a preparing unit for preparing file information of the converted image data file;

a posting unit for posting information including options of a receiving method for receiving the converted image data file on the receiving apparatus according to the file information to the receiving apparatus;

a receiving unit for receiving command information concerning a selected receiving method for receiving the converted image data file on the receiving apparatus according to the information including options from the receiving apparatus; and a transmission controlling unit for transmitting the converted image data file to the receiving apparatus based on the command information, wherein after a given time elapses from the time when the information including options of a receiving method for receiving the converted image data file is posted to the receiving apparatus by the posting unit, if the command information has not yet been received from the receiving apparatus, the transmission controlling unit prepares an image compilation data file compiled with the minimum resolution from the converted image data file to transmit the image compilation data file to the receiving apparatus, and if the command information has been received from the receiving apparatus within the given time, the transmission controlling unit transmits the converted image data file to the receiving apparatus based on the command information.

7. An image data transmitting apparatus transmitting image data to a receiving apparatus through a network, comprising:

an image data converting unit for converting the image data to a converted image data file;

a preparing unit for preparing file information of the converted image data file;

a posting unit for posting information including options of a receiving method for receiving the converted image data file on the receiving apparatus according to the file information to the receiving apparatus;

a receiving unit for receiving command information concerning a selected receiving method for receiving the converted image data file on the receiving apparatus according to the information including options from the receiving apparatus; and a transmission controlling unit for transmitting the converted image data file to the receiving apparatus based on the command information, wherein after a given time elapses from the time when the information including options of a receiving method for receiving the converted image data file is posted to the receiving apparatus by the posting unit, if the command information has not yet been received from the receiving apparatus, the posting unit posts the information including options of receiving method for receiving the converted image data file to a second transmission destination related to the receiving apparatus, and if the command information has been received from the receiving apparatus within the given time, the transmission controlling unit transmits the converted image data file to the receiving apparatus based on the command information.

8. An image data transmitting apparatus transmitting image data to a receiving apparatus through a network, comprising:

an image data converting unit for converting the image data to a converted image data file;

a preparing unit for preparing file information of the converted image data file;

a posting unit for posting information including options of a receiving method for receiving the converted image data file on the receiving apparatus according to the file information to the receiving apparatus;

a receiving unit for receiving command information concerning a selected receiving method for receiving the converted image data file on the receiving apparatus according to the information including options from the receiving apparatus; and a transmission controlling unit for transmitting the converted image data file to the receiving apparatus based on the command information, wherein after a given time elapses from the time when the information including options of a receiving method for receiving the converted image data file is posted to the receiving apparatus by the posting unit, if the command information has not yet been received from the receiving apparatus, the transmission controlling unit posts it to a given command destination that no command information has been received, and transmits the converted image data file to the receiving apparatus based on command information from the command destination, and if the command information has been received from the receiving apparatus within the given time, the transmission controlling unit transmits the converted image data file to the receiving apparatus based on the command information.

9. The image data transmitting apparatus according to claim 1, further comprising reading unit for reading a manuscript to generate image data and working as a scanning apparatus.

* * * * *

UNITED STATES PATENT AND TRADEMARK OFFICE
CERTIFICATE OF CORRECTION

| | |
|---|---|
| PATENT NO. | : 8,429,241 B2 |
| APPLICATION NO. | : 11/260620 |
| DATED | : April 23, 2013 |
| INVENTOR(S) | : Munehiro Natsume et al. |

It is certified that error appears in the above-identified patent and that said Letters Patent is hereby corrected as shown below:

On the Title Page in the References Cited, Item (56):

Under U.S. Patent Documents, at page 2, column 1, please add
--2004/0252335 A1    12/2004 Yano et al.--

Signed and Sealed this
Thirteenth Day of August, 2013

Teresa Stanek Rea
*Acting Director of the United States Patent and Trademark Office*